US008639547B1

(12) United States Patent
Judy

(10) Patent No.: US 8,639,547 B1
(45) Date of Patent: *Jan. 28, 2014

(54) METHOD FOR STATISTICAL COMPARISON OF OCCUPATIONS BY SKILL SETS AND OTHER RELEVANT ATTRIBUTES

(71) Applicant: Richard W. Judy, Indianapolis, IN (US)

(72) Inventor: Richard W. Judy, Indianapolis, IN (US)

(73) Assignee: Workforce Associates, Inc., Indianapolis, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 13/844,502

(22) Filed: Mar. 15, 2013

Related U.S. Application Data

(63) Continuation-in-part of application No. 13/327,320, filed on Dec. 15, 2011, which is a continuation-in-part of application No. 12/318,374, filed on Dec. 29, 2008, now Pat. No. 8,082,168.

(60) Provisional application No. 61/006,196, filed on Dec. 28, 2007.

(51) Int. Cl.
G06Q 40/00 (2012.01)
(52) U.S. Cl.
USPC .................................. 705/7.11; 705/7.42
(58) Field of Classification Search
USPC .................................. 705/7.11, 7.42
See application file for complete search history.

(56) References Cited

U.S. PATENT DOCUMENTS

| 5,416,694 | A | 5/1995 | Parrish et al. |
|---|---|---|---|
| 7,310,626 | B2 | 12/2007 | Scarborough et al. |
| 7,480,659 | B2 | 1/2009 | Chmura et al. |
| 7,593,860 | B2 | 9/2009 | Mitchell |
| 7,805,382 | B2 | 9/2010 | Rosen et al. |
| 8,195,657 | B1 | 6/2012 | Dellovo |
| 2002/0046199 | A1 | 4/2002 | Scarborough et al. |
| 2002/0055867 | A1 | 5/2002 | Putnam et al. |
| 2002/0077884 | A1 | 6/2002 | Sketch |
| 2003/0182178 | A1 | 9/2003 | D'Elena et al. |
| 2005/0267934 | A1 | 12/2005 | Brown et al. |
| 2005/0273350 | A1 | 12/2005 | Scarborough et al. |
| 2007/0059671 | A1 | 3/2007 | Mitchell |
| 2007/0294125 | A1 | 12/2007 | Thomsen |
| 2008/0027771 | A1 | 1/2008 | Steel |
| 2008/0059523 | A1 | 3/2008 | Schmidt et al. |
| 2008/0065467 | A1 | 3/2008 | Nyegaard |
| 2008/0086366 | A1 | 4/2008 | Concordia et al. |

OTHER PUBLICATIONS

"How Career Lattices Help Solve Nursing and Other Workforce Shortages in Healthcare;" CAEL (Jun. 2005), 161 sheets.
"The Indianapolis, Indiana Area Labor Availability Report," The Pathfinders (Sep. 2007), 50 sheets.
"O*NET-SOC 2000 to O*NET-SOC 2006 Lookup Table" (Apr. 2006), 33 sheets.

(Continued)

Primary Examiner — Thomas Dixon
Assistant Examiner — Benjamin S Fields
(74) Attorney, Agent, or Firm — Edwards Wildman Palmer LLP

(57) ABSTRACT

A method and system for measuring transferability of workers between and among occupations by means of the mathematical relationships between those occupations' key attributes, as defined by publicly available data on the competencies required as specified by a complete catalog of U.S. occupations known as O*NET. This method provides a concise, informative measurement for comparing the relative requirements of Abilities, Skills, Knowledge, and other relevant attributes of occupations, enabling users to gauge the feasibility of transferring workers from one occupation to another.

14 Claims, 6 Drawing Sheets

(56) References Cited

OTHER PUBLICATIONS

"Data Dictionary O*NET 12.0 Database," National Center for O*Net Development (Jun. 2007), 68 sheets.

"The O*NET Content Model," National Center for O*Net Development (date unknown), 1 sheet.

Roberts, M., Matrix of Skills Transferability, Human Resources and Skills Development Canada, Matrix of Transferability (Jan. 2003), accessed at http://www.rhdcc-hrsdc.gc.ca/eng/cs/sp/hrsdc/imp/publications/2003-002651/SP-587-04-04E.pdf.

Shaw, K. L., Occupational Change, Employer Change, and the Transferability of Skills, (Jan. 1987), Southern Economic Journal (53: 3). pp. 702-719.

Judy, R.W., et al., Workforce 2020: Work and Workers in the 21st Century, (1997), Hudson Institute, 175 pp.

Transferable Skill Analysis (2006), The Worksuite's On-line Service, accessed from: http://web.archive.org/web/20061120221228/http://www.theworksuite.com/resumes/idl_0.html.

Figure 1. Computation and creation of the TORQ database
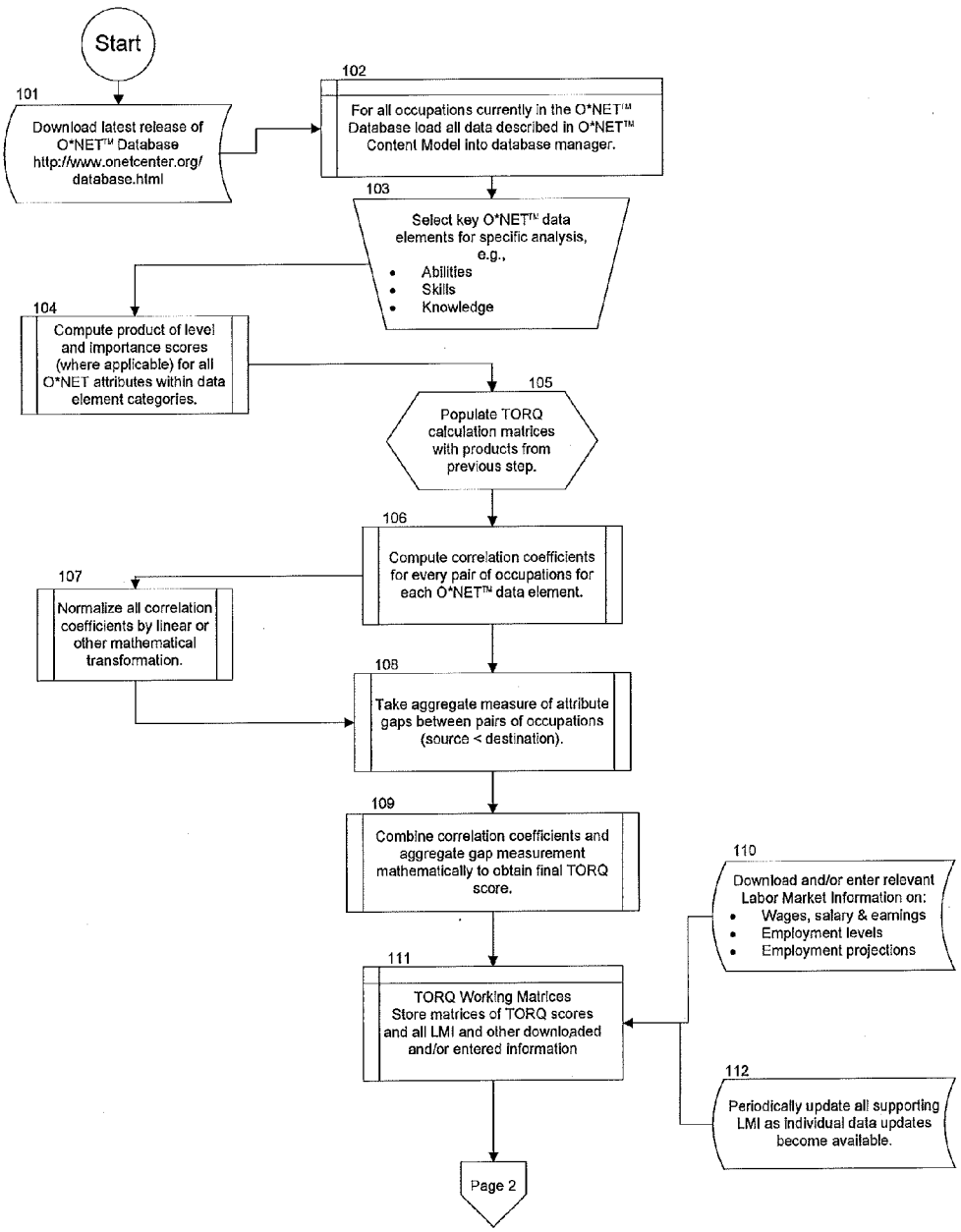
O*NET™ is a trademark of the U.S. Department of Labor, Employment and Training Administration.

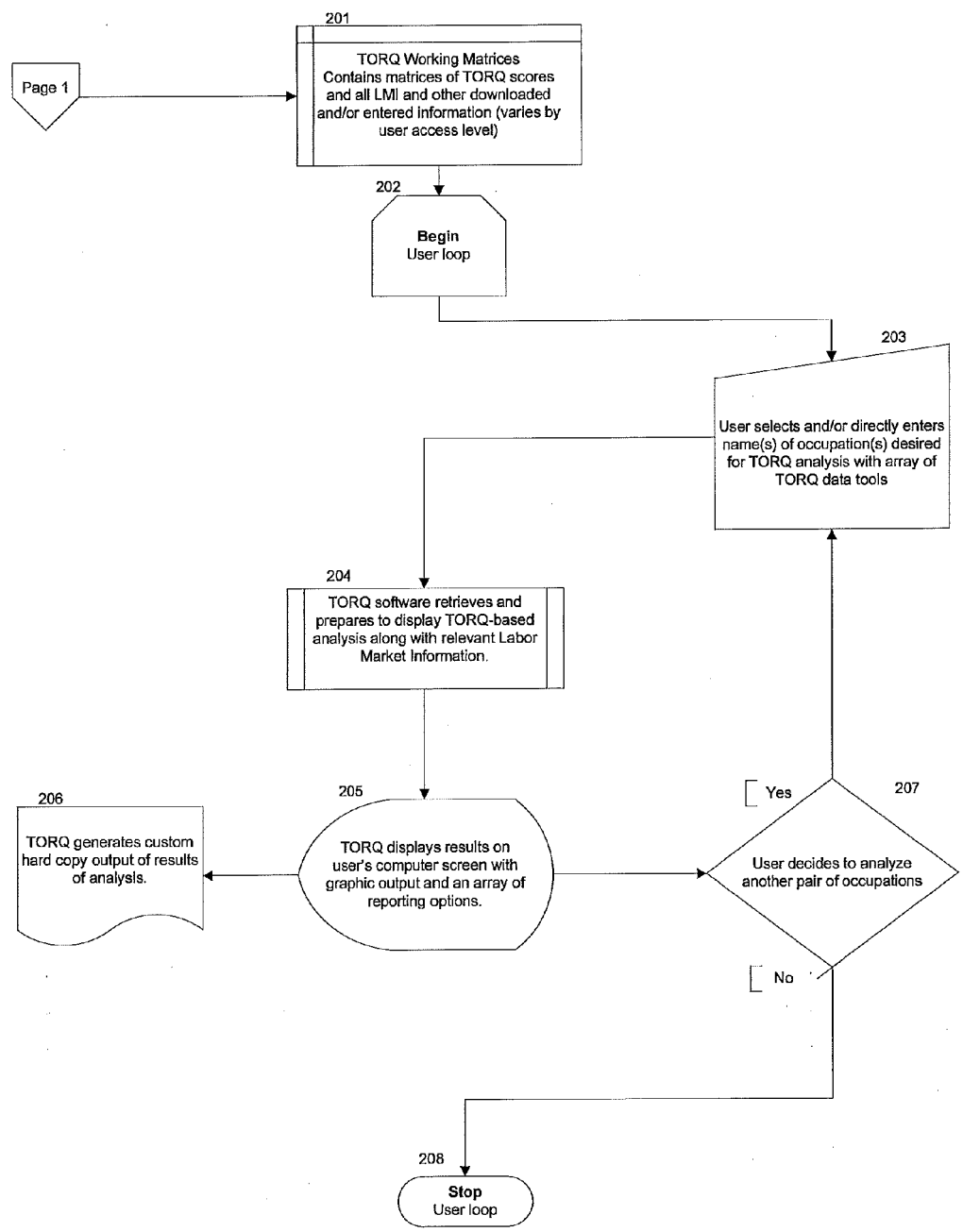
Figure 2. End User Retrieval of TORQ Database Information

Figure 3. Contents of the O*NET™ Database Used by TORQ

Contents of the O*NET™ Database Used by TORQ™

| Domains (301) | Descriptors (302) | Elements (303) | | | Data entries (304) | | | Notes re: O*NET12 (305) |
|---|---|---|---|---|---|---|---|---|
| | | 303a Major categories | 303b Minor categories | 303c Number | 304a Level | 304b Importance | 304c Data Value | |
| Worker Characteristics | Abilities | 4 | 14 | 53 | x | x | | 52 attributes with data in O*NET12 |
| | Occupational Interests | | | 6 | x | | | Separate field entries indicate the 1st, 2nd and 3rd highest of the six element names |
| | Work Values | 6 | | 21 | x | | | Major category values are averages (mean) of basic elements |
| | Work Styles | 6 | | 16 | | x | | |
| Worker Requirements | Basic Skills | 2 | | 10 | x | x | | |
| | Cross-Functional Skills | 5 | | 25 | x | x | | |
| | Knowledge | 8 | | 33 | x | x | | |
| | Education Level in Specific Subjects | | | 15 | | | | No data in O*NET12 |
| | Experience & Training | | | 4 | | | | Data for 3 in O*NET12 |
| Experience Requirements | Basic-Skills Entry Requirements | 2 | | 10 | | | | No data in O*NET12 |
| | Cross-Functional Skills Entry Requirements | 5 | | 25 | | | | No data in O*NET12 |
| | Licenses, certificates, or registration | 2 | | 9 | | | | No data in O*NET12 |
| | Education, Training & Experience | | | 12 | | | x | Data are in O*NET12 but not described in O*NET Content Model |
| Occupation-Specific Information | Tasks — Occupation-Specific Tasks List | | | 15,277 | | x | x | Of this total in O*NET12, 9,655 are "core," 4,967 are "Supplemental," and 605 are "n/a." |
| | Tools & Technology List | | | | | | | No data in O*NET12 |
| Workforce Characteristics | Labor Market Information | | | | | | | No data in O*NET12. Reference is to BLS |
| | Occupational Outlook | | | | | | | No data in O*NET12. Reference is to BLS |
| Occupational Requirements | Generalized Work Activities | 4 | 9 | 41 | | x | x | |
| | Detailed Work Activities | | | | | | | No data in O*NET12 |
| | Organizational Context | 2 | 32 | 66 | | | | No data in O*NET12 |
| | Work Context | 3 | 21 | 59 | Percentages of frequency and/or importance | | | 2 elements have no data in O*NET12 |

O*NET is a trademark of the
TORQ is a trademark of Workforce Associates, Inc.
Source: The O*NET® Content Model. (http://www.onetcenter.org/content.html#cm2) and http://www.onetcenter.org/database.html#download

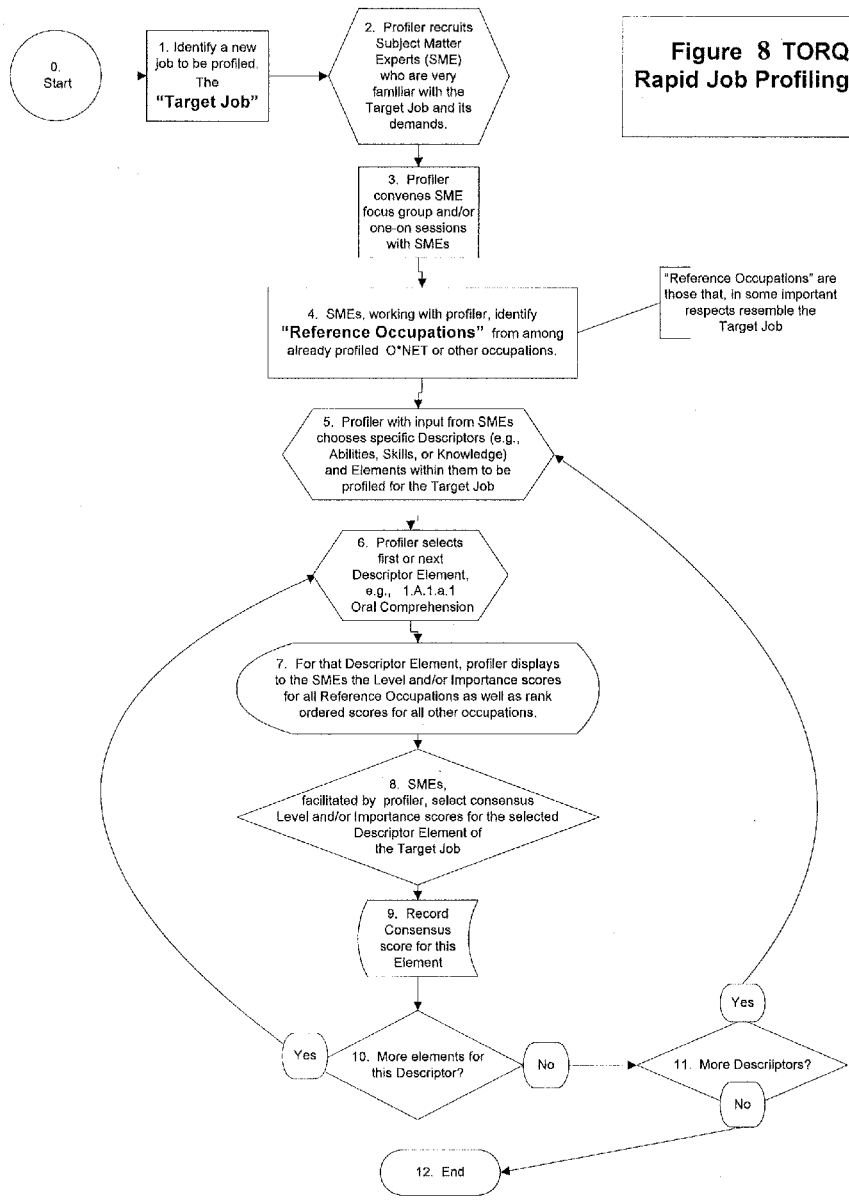

METHOD FOR STATISTICAL COMPARISON OF OCCUPATIONS BY SKILL SETS AND OTHER RELEVANT ATTRIBUTES

This continuation-in-part application claims priority on application Ser. No. 13/327,320 filed Dec. 15, 2011 which is a continuation-in-part of application Ser. No. 12/318,374 filed Dec. 29, 2008 now U.S. Pat. No. 8,082,168 which claims priority on provisional patent application 61/006,196 filed on Dec. 28, 2007.

TECHNICAL FIELD

This invention is called TORQ—the Transferable Occupation Relationship Quotient. TORQ is a mathematical manipulation of Labor Market Information (LMI) and other data, making use of publicly and privately available databases of key data about workers and occupations in the United States. It responds to a pervasive and continual need among economic developers, workforce development professionals, educators, and others for a useful way to assess the feasibility of transferring from one occupation to another. This invention's method for achieving this measure of "transferability" is based on mathematical relationships, including, but not limited to, statistical correlation of the skills, abilities, knowledge, and other attributes that are vital to each occupation.

BACKGROUND ART

Characterizing and comparing the vital attributes of occupations has been an important part of the field of labor economics for many years. During the past decade, two major databases of occupational information have become the most widely known and used sources of occupation profiles and attribute comparison. Following are detailed descriptions of these two databases, which in turn are key information sources of TORQ, the invention described in this application. Additionally, several other systematic attempts have been made to approach the concept of occupational comparison and job transfer. The most significant of those efforts are described here.

O*NET

O*NET™ refers to the U.S. Department of Labor's Occupational Information Network. O*NET's taxonomy of occupations is an extension of the occupation labels developed by the Bureau of Labor Statistics' Standard Occupational Classification (SOC) system.

For example, as of late 2008, O*NET's database provided detailed data on 809 separate officially defined occupations. Each of these occupations is associated with a set of descriptors according to the O*NET Content Model, derived from detailed observation and analysis of job characteristics of each described occupation. O*NET's database is periodically reviewed and updated to include information on new and emerging occupations. The current version, as of late 2011, is O*NET 16.

The O*NET Content Model includes all six of the domains listed below, together with all of the descriptors there under which are associated with each of O*NET's listed occupations:

Worker Characteristics—enduring characteristics that may influence both work performance and the capacity to acquire knowledge and skills required for effective work performance.
  Abilities—Enduring attributes of the individual that influence performance.
  Occupational Interests—Preferences for work environments. Occupational Interest Profiles (OIPs) are compatible with Holland's (1985, 1997) model of personality types and work environments.
  Work Values—Global aspects of work composed of specific needs that are important to a person's satisfaction. Occupational Reinforcer Patterns (ORPs) are based on the Theory of Work Adjustment (Dawis & Lofquist, 1984).
  Work Styles—Personal characteristics that can affect how well someone performs a job.
Worker Requirements—descriptors referring to work-related attributes acquired and/or developed through experience and education.
  Basic Skills—Developed capacities that facilitate learning or the more rapid acquisition of knowledge
  Cross-Functional Skills—Developed capacities that facilitate performance of activities that occur across jobs.
  Knowledge—Organized sets of principles and facts applying in general domains.
  Education—Prior educational experience required to perform in a job.
Experience Requirements—requirements related to previous work activities and explicitly linked to certain types of work activities.
  Experience and Training—If someone were being hired to perform this job, how much of the following would be required?
  Basic Skills—Entry Requirement—Entry requirement for developed capacities that facilitate learning or the more rapid acquisition of knowledge.
  Cross-Functional Skills—Entry Requirement—Entry requirement for developed capacities that facilitate performance of activities that occur across jobs.
  Licensing—Licenses, certificates, or registrations that are awarded to show that a job holder has gained certain skills. This includes requirements for obtaining these credentials, and the organization or agency requiring their possession.
Occupation-Specific Information—variables or other Content Model elements of selected or specific occupations.
  Tasks—Occupation-Specific Tasks.
  Tools and Technology—Machines, equipment, tools, software, and information technology workers may use for optimal functioning in a high performance workplace.
Labor Market Characteristics—variables that define and describe the general characteristics of occupations that may influence occupational requirements.
  Labor Market Information—Information related to economic conditions and labor force characteristics of occupations.
  Occupational Outlook—Projections of future economic conditions and labor force characteristics of occupations.
Occupational Requirements—a comprehensive set of variables or detailed elements that describe what various occupations require.
  Generalized Work Activities—General types of job behaviors occurring on multiple jobs.
  Detailed Work Activities—Detailed types of job behaviors occurring on multiple jobs.
  Organizational Context—Characteristics of the organization that influence how people do their work.

Work Context—Physical and social factors that influence the nature of work.

The information O*NET provides about each occupation is exhaustive and comprehensive. The multiple dimensions of occupational attributes cataloged by O*NET make the description of each occupation both extremely rich and highly complex. A table listing the major and minor components of the O*NET database and their hierarchical relationships is presented in FIG. 3.

Researchers attempting to make use of the O*NET database have been accordingly limited in their ability to embrace the entire set of data in several kinds of studies involving career transfer and career paths. Most efforts to make productive use of the O*NET database have only encompassed one or a few dimensions of O*NET occupational data, or have merely repackaged O*NET data verbatim within various graphic and/or tabular displays or reports.

WORKKEYS®

Another database of Skills and Abilities by occupation is provided by ACT, Inc. and which is known as WORKKEYS®. WORKKEYS provides a more concise set of groupings of Skills and Abilities—eight (8) groupings in all. Each of these categories—e.g. Applied Mathematics or Locating Information—is rated on a 0-7 scale. Like O*NET's occupational attributes, the information supplied by WORKKEYS is derived from a system of job profiling based on detailed observation and interviewing.

The major advantage of WORKKEYS is that it also features a worker assessment component, whereby individuals take tests to determine their personal skill levels in each of the crucial WORKKEYS dimensions. This component is highly useful to business recruiters and workforce and human resource professionals wishing to match individuals to job opportunities. The combination of career-to-career comparison and individual-to-career comparison has made WORKKEYS a preferred database for occupational information among the world of workforce development, despite the relative thinness of its occupational information compared to O*NET.

Transferable Skills and Gap Analysis

The concept of "transferable skills" has been the subject of a great deal of research and exploration among labor economists as well as among workforce and economic developers. From the workforce development standpoint, evaluating transferable skills has long been the concern of those tasked with finding new employment opportunities for displaced workers, whether individually or in the case of a mass layoff or plant closing. For economic developers, quickly assessing transferable skills present in a region's workforce is important to efforts to recruit and retain businesses.

Additionally, the interests of workforce development would be well served by a reliable method for assessing the skills present in a region's workforce. Much has been made lately of the importance of "skills gap analysis" as a tool for assessing the condition of local workforces, and preparing a region's workforce for $21^{st}$-century economy occupations. Most such efforts, however, have found that, while estimating shortages for individual occupations is relatively easy, given plentiful public employment information, it is much more difficult to assess the skills of an area's labor force in a similar way, absent an exhaustive community survey or other such expensive measures.

Career Ladders, Lattices, and Pathways

Related to the idea of skills transfer is the construction of networks that are variously known as career ladders, lattices, and/or pathways. These models of the interconnections between careers in similar fields or requiring similar Skill/Ability/Knowledge sets are designed for and used by guidance and employment counselors and human resources professionals to illustrate the possibilities offered by particular career and/or educational choices.

The various labels for these career maps imply different approaches to the network of career relationships. A career ladder indicates a more or less linear progression of education and experience in jobs of similar natures in the same or similar industries. A career lattice is a more inclusive set of occupations, based on relationships of skills, education levels, abilities, earnings, industries, and many other bases of comparison. A career path or pathway, then, describes any set of interconnected occupations within this larger career lattice.

It has historically been more difficult to construct a career lattice than a career ladder. The career path from a Certified Nursing Assistant to a Registered Nurse is relatively straightforward, but finding occupations with comparable attributes that might supply a need for skilled warehouse workers may be more difficult. Efforts to create career lattices based on observed O*NET or WORKKEYS attributes have been attempted, but none so far has taken a comprehensive view of these attributes with statistical rigor and precision that embraces the entire data set represented by either of these databases.

Competency Modeling

A close relative to the notion of career ladders and pathways is a product called a "competency model." A U.S. Department of Labor-sponsored project called the "Competency Model Clearinghouse" has produced such models based on the Abilities, Skills, and Knowledge requirements of general employment in broad industry sectors and/or clusters, such as Information Technology, Advanced Manufacturing, and others.

These "competency models" consist of pyramidal representations of the varieties of Abilities, Skills, and Knowledge that are required for any occupation within a given industry sector or cluster. The bottom level of the pyramid contains the most basic "employability" attributes like "interpersonal skills" and "initiative." Subsequent levels attain more and more specificity to the given industry, examining common knowledge bases required of all Information Technology professionals, for example. In the upper levels of these competency models, occupation-specific job requirements are quoted directly from O*NET.

These competency models do employ a systematic approach to their construction and definition, consisting of consultation with employers within the given industry for which the model has been constructed. This application, however, is by its nature more useful in a broader strategic sense than at the level of individual occupations. At the occupational level, competency models yield no more specific information than does raw O*NET data.

BRIEF DESCRIPTION OF THE DRAWINGS

FIG. 1 is a flowchart describing the process by which data are obtained and transformed to compute and store values for the Transferable Occupation Relationship Quotient;

FIG. 2 is a flowchart describing the process of end user interface to retrieve information derived from the Transferable Occupation Relationship Quotient;

FIG. 3 is a detailed table listing the various dimensions of the Department of Labor's O*NET occupational database used to calculate the Transferable Occupation Relationship Quotient;

FIG. 8 is a flowchart describing the Rapid Job Profiling Tool.

DISCLOSURE OF THE INVENTION

Figure 4:
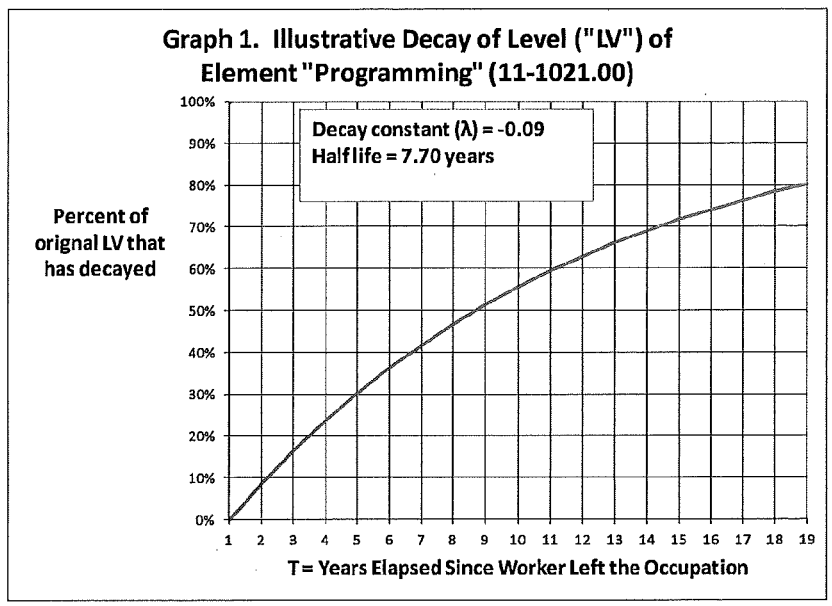
FIG. 4 is the percent of the original LV that has decayed after the passage of T years which are measured along the X axis.

TORQ begins with the statistical principle of correlation, i.e. "a single number that describes the degree of relationship between two variables." TORQ computations can be performed by means of a computer, software and a database where necessary.

Mathematically, a correlation is computed according to the following formula derived from the Web Center for Social Research Methods, where x and y are the two variables in question:

$$\mathrm{Correl}(X, Y) = \frac{\sum_{i}^{Nk} \{(x_i - \mu_x)(y_i - \mu_y)\}}{\left[\sqrt{\sum_{i}^{Nk}(x_i - \mu_x)^2 \sum_{i}^{Nk}(y_i - \mu_y)^2}\right]}$$

The ratio (Correl(X,Y)) produced by this formula is known as a correlation coefficient.

By applying this computation to the complete set of scores—that is, O*NET and WORKKEYS values for element "Levels" and "Importance" of Skills, Abilities, Knowledge, and all other attributes relevant to any two given occupations within the database, the first building block of the TORQ computation is obtained. The multiple dimensions of attribute values in the O*NET and WORKKEYS database (for example; Skills, Abilities, and Knowledge in O*NET or Applied Mathematics and Locating Information in WORKKEYS) each produce their own individual correlation coefficient. The resultant values produced by the correlation algorithm are normalized to a scale of 0 to 100.

Once the correlation coefficients are computed, the process of TORQ calculation continues with an adjustment step which incorporates measures of the individual gaps between all of the composite Level-Importance scores of the Abilities, Skills, and Knowledge attributes (or, as they are termed in O*NET the "elements") for the pair of occupations being analyzed for which those scores for the destination occupation exceeds those for the source occupation. This aggregate measure is then used to adjust the previously calculated correlation coefficients in order to provide a more precise indication of the relationship between occupations and to create an accurate representation of the asymmetry of transfer between occupations.

The adjusted TORQ scores still take values from 0 to 100. A zero value indicates no significant congruence or lack thereof between occupations' Skills, Abilities, and/or Knowledge; and a value of 100 indicates total congruence. (Obviously, each occupation has a TORQ value of 100 relative to itself for all descriptors.)

It should be noted that TORQ values are calculated for each significant descriptor of occupational attributes being compared, i.e., for Abilities, Skills, Knowledge, etc. There is also a combined measure known as a "Grand TORQ," which is obtained by taking a weighted average of all the TORQ values for all the individual descriptor categories measured. "Weighted average" indicates that the calculation of the Grand TORQ can be adjusted to reflect the user's sense of priorities concerning the attributes of each pair of occupations, based on a combination of the correlation coefficients described above.

The full articulation of the mathematical process of calculating TORQ follows below.

DETAILED DESCRIPTION OF THE DRAWINGS

The following detailed account describes the procedural steps involved in calculating TORQ and user extraction of information from the TORQ database.

Computation and Creation of the TORQ Database (FIG. 1)

101. Acquire O*NET Data for Each Occupation

The process begins with the acquisition of current occupational profile data from the Department of Labor's online O*NET database (or WORKKEYS or a comparable substitute should O*NET data become unavailable at some point).

102. Load complete Set of O*NET Data for Each Occupation into Database

These data are then loaded into a database management program for further manipulation. The current database type for TORQ uses the Structured Query Language (SQL). Each occupation in this database is re-indexed according to a simple set of Occupation Numbers (OCCNOs).

103. Select Attribute Dimensions for Entry into TORQ Calculation Matrices

Each occupational descriptor (e.g. Skills) is selected individually, and scores for both Level and Importance for each element within the given descriptor (e.g. "Active Listening" within Skills) are entered. The current active descriptors for TORQ calculation include Abilities, Skills, and Knowledge. Other descriptors may be used to create TORQ calculation matrices as well, in like fashion.

104. Multiply Level and Importance Scores for All Elements in Each Descriptor Within each descriptor, the product of each element's Importance and Level scores is calculated, creating a "Combined Multiplicative Descriptor" (or CMD") of for each element within the context of each occupation.

105. Create the TORQ Calculation Matrices

In every descriptor (e.g. Skills) a separate calculation matrix is created, which consists of the CMD scores produced by the multiplication in step (4). Each matrix contains the complete set of these composite scores for every occupation in two dimensions, to allow direct comparison of any occupation with any other. Thus, the dimension of a given descriptor matrix is n×m where n=the number of occupations in the current version of the O*NET database and m=number of individual elements in the given descriptor dimension.

106. Correlate Scores Across All Pairs of Occupations

Then, for every one of these calculation matrices, the correlation process F1 is applied to produce a correlation coefficient.

107. Normalize Correlation Coefficients

Each resulting correlation coefficient is then normalized to a 0 to 100 scale via a linear or other mathematical transformation. This resulting normalized coefficient is the first primary component of the Transferable Occupation Relationship Quotient (TORQ), but this alone does not comprise the final TORQ value.

108 and 109. Refine TORQ Value Through Systematic Evaluation of Gaps

The adjustment of the final TORQ value incorporates measures of the individual gaps between all of the composite Level-Importance scores of the Abilities, Skills, and Knowledge elements for the pair of occupations being analyzed. For this purpose, a second type of "cross" Composite Mulitcative Descriptor is computed which we designate as $CMD^{TF}$ and which is computed in the following way:

Consider an occupation from which the transfer is to be made and term that the "FROM" occupation. Consider, also, the occupation to which the transfer is to be made and term that the "TO" occupation. The $CMD^{TF}$ is computed by multiplying the Importance score of the TO occupation times the Level score of the FROM occupation.

For each element, the sum of the differences between the conventional CMD scores for the TO occupation and the $CMD^{TF}$ relevant to the two occupations. However, this summation is made only in those cases for which the CMD for the TO occupation exceeds that of the $CMD^{TF}$. The sum of those differences as so computed is then divided by the sum of CMD for the TO occupation. This aggregate measure (i.e., the ratio produced as just described) is then used to adjust the previously calculated correlation coefficients. This adjustment makes the TORQ value more accurate and useful in at least two important ways:

First, it corrects the strictly correlation-based calculation by introducing a quantitative measure of the asymmetry between the transferability between members of pairs of occupations. In the usual case, the measure of the transferability (i.e., the TORQ) of a worker in occupation "A" to occupation "B" is not the same as the TORQ in the opposite direction, i.e., from "B" to "A." The transferability of a paralegal to become a lawyer, for example, is not the same as that of a lawyer transferring to become a paralegal. Taking account of the gaps in the occupational attributes as described above ensures that this asymmetry will be reflected in the TORQ values. (In other words, the TORQ value will not be the same for the paralegal→lawyer transition as it would for the lawyer→paralegal transition.)

Second, it accounts for the rare but problematic instances in which the composite Level-Importance scores of two occupations are highly correlated but where large and uniform gaps exist between the two sets of scores. In such cases, a high correlation coefficient taken by itself is a spurious indicator of the actual transferability of workers. If two occupations require similar ASKs (Abilities, Skills, and Knowledge) but there exist consistently large gaps in the scores required between the two across the entire range of ASKs, then a mere correlation coefficient would look similar for these two occupations as it would for two which are genuinely closely related and present a real possibility for transfer. Adjusting the correlation coefficient by applying a measure of the attribute gaps between the two occupations' scores minimizes the possibility that the final TORQ will indicate a spurious degree of transferability.

110. Acquire and Synchronize Related Labor Market Information by Occupation

Separately, other labor market information (LMI) is downloaded and stored, and catalogued by the OCCNO of each occupation, to provide matches for each occupation in the TORQ database. This LMI set includes such indicators as prevailing median wages for occupations, estimates of current and projected future regional employment in each occupation, and a wide variety of other information at the national, state, and region-specific levels.

The scope and variety of LMI included in these datasets is determined partially by the set of end users making use of TORQ, and their geographic areas of interest. Currently TORQ uses LMI databases from the national Occupation and Employment Survey (OES) for detailed current information, and state and local information supplied by clients at those levels for purposes of maximum local relevance and the provision of employment projections for estimates of future occupational change.

111. Create TORQ Master Database

Once calculated, TORQ values for every available pair-wise combination of occupations, along every comparable attribute set (e.g. Abilities, Skills, Knowledge, etc.), are stored in a complete database which also contains the catalogued accompanying LMI values for each OCCNO-listed occupation.

112. Update Calculations and LMI

Periodically, updates are supplied to the data upon which TORQ relies for calculation of TORQ values itself—i.e. new editions of O*NET—and for the labor market information which accompanies the occupations in this database. These data sources are monitored regularly and used to refresh the TORQ database of occupational information whenever the source data are renewed. As of the filing of this patent application, TORQ uses values from O*NET version 15, pending the inventor's review of possible irregularities in the new O*NET version 16 released in 2011. Also, new state and sub-state-level clients supply current, local relevant labor market information to use with their own TORQ operations—supplied through the TORQ online user interface.

End User Retrieval of TORQ Database Information (FIG. 2)

201. End User Interactive Access

An end user accessing the TORQ database interacts with it through a front-end software application. This application currently takes the form of a Web-based interface, customized for use by different types of users, which can access TORQ database information over the Internet via a central server which stores and updates TORQ data.

202. Begin User Loop

This begins the sequence of activity for any analytical exercise within the TORQ interactive system.

203. User Actions Querying TORQ Database

This end user application allows the user to query the TORQ database for TORQ values based on pairs of occupations, and on analysis of the TORQ relationships between one occupation and a number of promising alternatives for transfer, via various major tools and sections of the online TORQ user interface. Users may also adjust the output from the database upon the basis of controls for the sensitivity of data to the user's specified criteria. Different types of users will have access to different sets of data controls, depending on the kinds of labor market information relevant to their interests. (A labor economist, for example, may make use of a wider range of statistical sensitivity controls than a career counselor, and might make use of data tools more relevant to long-term strategic analysis than immediate tactical transfer options.)

204. TORQ System Database Query and Report Generation

After receiving instructions for data retrieval and sensitivity controls, the TORQ database produces a report of TORQ values and all specified LMI for the occupations and other data input by the end user.

205. Display Results of Query and LMI Analysis

This report is displayed on the user's screen, in a format which can be printed, saved, etc. according to the user's preference.

206. User Hard Copy Output Generation

The user may choose to produce a hard copy of the output generated by the TORQ system, which may be done in a variety of ways.

207 and 208. Repeat Analysis and User Logoff

The querying and reporting process can be repeated for as many iterations and variations on analysis as the user prefers before ending the user loop.

Contents of the O*NET Database Used by TORQ (FIG. 3)

This figure describes the major portions of the O*NET spectrum of occupational information and their various subdivisions and data contents:

Domains (301): Describes the "domain" of occupational information to which various sets of attributes belong. (This corresponds with the O*NET list of domains cited above in the "Background Art" section.)

Descriptors (302): This lists the sets of major groupings of occupational attributes within each domain.

Elements (303): Descriptions of the various subdivisions of information within each "Descriptor" group. These include:

303a Major Categories—Number of major divisions of the "Descriptor" group.

303b Minor Categories—Number of subdivisions of the Major Categories.

303c Number—the total number of attributes (or "elements") listed within the "Descriptor" group.

Data Entries (304): Descriptions of the type of data reported by O*NET within each "Descriptor" group. These include:

304a Level—An O*NET-defined "Level" of each attribute measured for the occupation in question. (e.g. the level of night vision required by a truck driver)

304b Importance—The O*NET-defined "Importance" value assigned to each attribute to the occupation in question. (For example, night vision is not very important for an accountant.)

304c Data Value—A data value that exists on its own scale (independent of O*NET's ranking system). (For example, education levels are defined as High School Graduate, BA/BS Degree, etc.)

Notes re: O*NET 12 (305): Pertains to the status of each data component in the developing new release of the O*NET database, which will form the updated and expanded library of information for TORQ computation upon its release. (As previously noted, TORQ is designed to runs on the most recent version of the O*NET database, but is not limited to the O*NET database.) A further distinguishing characteristic of TORQ is that it allows each group of users ("clients") to use databases of its own choice. For example, one client group could prefer that its TORQ results should be computed using O*NET 15 while another would prefer results from O*NET*16.

Articulation of Mathematical TORQ Calculation Process

The full process of mathematical computation of the Transferable Occupation Relationship Quotient is articulated below. This process provides the mathematical basis for component (106) of FIG. 1, the mathematical correlation process that feeds the initial TORQ computation flow chart.

Definitions of Symbols:

V denotes the sequential number of the most current version of the O*NET database. As explained before, TORQ seeks to use the latest version O*NET. The Examples below use O*NET 12 so the value of V is 12.

Symbols and Definitions for Occupations:

$O^v$ equals the number of occupations for which data are supplied in the $v^{th}$ version of the O*NET database. Circa late 2007, $O^v \equiv O^{12}$.

$O^{12} = 801$ $^{OCCNO}O^v$ denotes the occupation with "Occupation Number" (or OCCNO) in $O^v$ and. Its value goes from 1 to $O^v$.

For example, in O*NET12, the first occupation listed in the database (i.e., OCCNO=1) carries the SOC code of 11-1011.00 which corresponds to "Chief Executives." The last occupation listed in O*NET12 (i.e., OCCNO=801) carries the SOC code of 53-7121.00 which corresponds to "Tank Car, Truck, and Ship Loaders."

Symbols and Definitions for Descriptors, Elements and Scores:

For every $^{OCCNO}O^v \exists D^v$, a set of O*NET descriptors (e.g., "Abilities;" "Skills;" Knowledge;") in the $v^{th}$ version of the O*NET database.

$^vM$ equals the number of O*NET descriptors (e.g., "Abilities;" "Skills;" "Knowledge;") in the $v^{th}$ version of the O*NET database plus the number of CMDs computed as described below.

$^{12}M = 24$. A complete list of the 21 descriptors in O*NET12 is displayed in FIG. 3, plus three CMDs for Abilities, Skills and Knowledge.

For each descriptor $^dD^v \in D^v$, (d=1, 2, ..., $^vM$), $\exists$ a set of elements which represent attributes of that descriptor. For example, for the descriptor called "Abilities" in O*NET12, there exist 52 elements with data for scores beginning with "Oral Comprehension" and continuing with "Written Comprehension," "Oral Expression" and so on for 49 more elements.

For each element in each descriptor, there exists one or more sets $S^k$ consisting of $N^k$ scores where $S^k \ni x_i$, (i=1, 2, ..., $N^k$).

To illustrate, in O*NET12, for each of the elements for Abilities, Skills and Knowledge there exist two sets of scores, one for "Level" and the second for "Importance."

Additionally, by multiplying the values for Level and Importance we obtain a third measure which we term the "Combined Multiplicative Descriptor" or "CMD" for each element.

And therefore, where:

OCCNO=1 which translates to "Chief Executives"

v=12;

d=Abilities;

k=Level i=1 meaning "Oral Comprehension"

So, $x_1 \in S^k$ is equal to 5.50 which is the Level score for Oral Comprehension for Chief Executives in O*NET12.

Similarly, when k=Importance, we have $x_1 \in S^k$ equal to 4.92 which is the Importance score for Oral Comprehension for Chief Executives in O*NET 12.

Finally, for the "Combined Multiplicative Descriptor" or "CMD" for Oral Comprehension for Chief Executives in O*NET 12, we compute the product of Level times Importance. For the element of Oral Comprehension for Chief Executives in O*NET 12, we obtain value for the CMD as 5.50 times 4.92=27.06.

Finally, as previously noted, for each pair of TO-FROM occupations, we also compute a "cross" composite multicative descriptor which we denote as $CMD^{TF}$. The $CMD^{TF}$ is computed by multiplying the Importance score of the TO occupation times the Level score of the FROM occupation. Note that TORQ correlation analysis employs only the conventional CMD. The $CMD^{TF}$ is used only in the "gap analysis" previously described.

To illustrate the computation of the $CMD^{TF}$ consider a contemplated transfer FROM a Funeral Director (O*NET code 11-9061.00) to Chief Executive (O*NET code 11-1011.00). In O*NET 12, the Oral Comprehension Level score for Funeral Director is 3.88 while the Oral Comprehension Importance score for Chief Executive is 4.92. Therefore, the $CMD^{TF}$ in this case would be 3.88 times 4.92=19.09. Incidentally, the "gap" between the conventional CMD for Chief Executive's Oral Comprehension (i.e., 27.06) and the $CMD^{TF}$ in this case would be 7.97. That would indicate that Funeral Directors' Oral Comprehension, as viewed through the "eyes" of Chief Executive's Importance comes up considerably short. It is this type of "gap" measure that the TORQ algorithm employs to adjust the correlation coefficients between the conventional CMDs of the two occupations.

Working with Matrices from O*NET in TORQ

Recall that for each element in each descriptor, there exists one or more sets $S^k$ consisting of $N^k$ scores where $S^k \ni x_j$, (j=1, 2, ..., $N^k$). In most cases, there are two such sets for each descriptor (Level and Importance). The number of scores in the O*NET database is very large and TORQ builds two 801×801 matrices for each descriptor $S^k$ and for each type of data provided (e.g., Level, Importance, etc.). To illustrate, among the matrices from O*NET12, TORQ builds these:

- For the Abilities descriptor alone, there are 52 Level scores and 52 Importance Scores. Each of these creates a matrix in the working database of dimension 801×52. Each of those contains 42,453 individual scores.
- For Occupational Interests, there are 6 scores for Level which produces a matrix of dimension 801×6 containing 4,806 scores.
- For Work Values, there are 21 scores for Level which gives a matrix of dimension 801×21 containing 16,821 scores.
- For Work Styles, there are 16 Importance scores which gives a matrix of dimension 801×16 containing 12,816 scores.
- For Basic Skills, there are 10 scores each for Level and Importance which gives two matrices of dimension 801×10. Each of these contains 8,010 scores.
- For Cross-Functional Skills, there are 25 scores each for Level and Importance which gives two matrices of dimension 801×25 containing 20,025 scores each.
- For Knowledge, there are 33 scores each for Level and Importance which gives two matrices of dimension 801×33 containing 26,433 scores each.
- For Abilities, Skills, and Knowledge, the scores for Level and Importance are multiplied to produce three synthetic descriptors called "Combined Multiplicative Descriptors" (or "CMDs") each of which has the same dimensions as the original descriptor.

Formula for Computing the Correlation Coefficients

For every descriptor or CMD, $^dD^v \in D^v$, let X and Y represent two vectors in a set, $S^k$, of scores for the $x^{th}$ and $y^{th}$ occupations where both x and y run from 1 to $O^v$ (which, for O*NET12 would be from 1 to 801). Then the Correlation Coefficient for that pair [abbreviated Correl(X,Y)] is computed in TORQ as follows:

$$\text{Correl}(X, Y) = \frac{\sum_i^{N^k} \{(x_i - \mu_x)(y_i - \mu_y)\}}{\sqrt{\left[\sum_i^{N^k}(x_i - \mu_x)^2 \sum_i^{N^k}(y_i - \mu_y)^2\right]}}$$

Where:
$x_i \in X$ and $y_i \in Y$, i=1 ..., $N^k$ and (j=1, 2, ..., $N^k$);

$$\mu_x = \frac{\sum_i^{N^k}(x_i)}{N^k}$$

(i.e., the mean value of the X vector) and $$\mu_y = \frac{\sum_i^{N^k}(y_i)}{N^k}$$

(i.e., the mean value of the Y vector).

For each descriptor or CMD, $^dD^v \in D^v$, for which scores exist in the current version of the O*NET database (for Level, Importance, or other data value), TORQ computes correlation coefficients as just described for every pair of the $O^v$ occupations. These correlation coefficients may range in value from −1 to +1.

Normalization of the Correlation Coefficients

TORQ "normalizes" each correlation coefficient by multiplying it by 100 (or otherwise linearly transforming it). For each descriptor, therefore, the computation and this normalization produce a square matrix of correlation coefficients of dimension 801×801 that is symmetric around its diagonal axis.

For example, if a given user of TORQ based on ONET12 preferred to analyze only the descriptors of Abilities, Skills and Knowledge (rather than the entire gamut of O*NET descriptors) then there would be nine matrices of correlation coefficients, each of dimension of 801×801. They would be for the Level and Importance of the three descriptors selected for analysis plus an additional matrix of CMD correlation coefficients corresponding to the original three descriptors. Obviously, the number of matrices of correlation coefficients increases in proportion to the number of descriptors chosen for analysis.

Illustration of TORQ Calculation Based on Existing O*NET Occupational Attributes To illustrate the procedure described above, consider how the Abilities Importance correlation coefficient is computed for one pair of occupations, namely Cardiovascular Technologists and Technicians (SOC 29-2031.00) and Registered Nurses (29-1111.00).

Step 1: Download the latest O*NET database which, for the purposes of this illustration, is O*NET 12.0 Database and is to be found on the Internet. Store these data in a local database editor and/or spreadsheet program.

Step 2: Retrieve the Abilities Importance and Level Scores for both occupations.

Step 3: Standardize the original Data Value according to the following formula as provided by O*NET.

The Level and Importance scales each have a different range of possible scores. Ratings on Level were collected on a 0-7 scale, ratings on Importance were collected on a 1-5 scale, and ratings on Frequency were collected on a 1-4 scale. To make reports generated by O*NET Online more intuitively understandable to users, descriptor average ratings were standardized to a scale ranging from 0 to 100. The equation for conversion of original ratings to standardized scores is:

$S=((O-L)/(H-L))*100$ where S is the standardized score, O is the original rating score on one of the three scales, L is the lowest possible score on the rating scale used, and H is the highest possible score on the rating scale used. For example, an original Importance rating score of 3 is converted to a standardized score of 50 (50=[[3−1]/[5−1]]*100). For another example, an original Level rating score of 5 is converted to a standardized score of 71 (71=[[5−0]/[7−0]]*100).

In this case, S=((Original Data Value−1)/4. The original and standardized values for the Importance Scores of the various Abilities element of O*NET coded occupations 29-1111.00 and 29-2031.00 are shown in the following table:

| O*NET Occupation Code | O*NET Element Code | Element Title | | Original | Standard-ized |
|---|---|---|---|---|---|
| 29-1111.00 | 1.A.1.a.1 | Oral Comprehension | IM | 4.25 | 81.3 |
| 29-1111.00 | 1.A.1.a.2 | Written Comprehension | IM | 3.88 | 72.0 |
| 29-1111.00 | 1.A.1.a.3 | Oral Expression | IM | 4.63 | 90.8 |
| 29-1111.00 | 1.A.1.a.4 | Written Expression | IM | 4 | 75.0 |
| 29-1111.00 | 1.A.1.b.1 | Fluency of Ideas | IM | 2.5 | 37.5 |
| 29-1111.00 | 1.A.1.b.2 | Originality | IM | 2.38 | 34.5 |
| 29-1111.00 | 1.A.1.b.3 | Problem Sensitivity | IM | 4.75 | 93.8 |
| 29-1111.00 | 1.A.1.b.4 | Deductive Reasoning | IM | 4 | 75.0 |
| 29-1111.00 | 1.A.1.b.5 | Inductive Reasoning | IM | 4.25 | 81.3 |
| 29-1111.00 | 1.A.1.b.6 | Information Ordering | IM | 3.5 | 62.5 |
| 29-1111.00 | 1.A.1.b.7 | Category Flexibility | IM | 3 | 50.0 |
| 29-1111.00 | 1.A.1.c.1 | Mathematical Reasoning | IM | 1.88 | 22.0 |
| 29-1111.00 | 1.A.1.c.2 | Number Facility | IM | 1.63 | 15.8 |
| 29-1111.00 | 1.A.1.d.1 | Memorization | IM | 2.63 | 40.8 |
| 29-1111.00 | 1.A.1.e.1 | Speed of Closure | IM | 3 | 50.0 |
| 29-1111.00 | 1.A.1.e.2 | Flexibility of Closure | IM | 3.25 | 56.3 |
| 29-1111.00 | 1.A.1.e.3 | Perceptual Speed | IM | 2.63 | 40.8 |
| 29-1111.00 | 1.A.1.f.1 | Spatial Orientation | IM | 1.38 | 9.5 |
| 29-1111.00 | 1.A.1.f.2 | Visualization | IM | 1.75 | 18.8 |
| 29-1111.00 | 1.A.1.g.1 | Selective Attention | IM | 3.5 | 62.5 |
| 29-1111.00 | 1.A.1.g.2 | Time Sharing | IM | 3.25 | 56.3 |
| 29-1111.00 | 1.A.2.a.1 | Arm-Hand Steadiness | IM | 3 | 50.0 |
| 29-1111.00 | 1.A.2.a.2 | Manual Dexterity | IM | 3.13 | 53.3 |
| 29-1111.00 | 1.A.2.a.3 | Finger Dexterity | IM | 2.38 | 34.5 |
| 29-1111.00 | 1.A.2.b.1 | Contol Precision | IM | 2.25 | 31.3 |
| 29-1111.00 | 1.A.2.b.2 | Multilimb Coordination | IM | 2.25 | 31.3 |
| 29-1111.00 | 1.A.2.b.3 | Response Orientation | IM | 1.88 | 22.0 |
| 29-1111.00 | 1.A.2.b.4 | Rate Control | IM | 1.13 | 3.3 |
| 29-1111.00 | 1.A.2.c.1 | Reaction Time | IM | 2 | 25.0 |
| 29-1111.00 | 1.A.2.c.2 | Wrist-Finger Speed | IM | 1.25 | 6.3 |
| 29-1111.00 | 1.A.2.c.3 | Speed of Limb Movement | IM | 1.88 | 22.0 |
| 29-1111.00 | 1.A.3.a.1 | Static Strength | IM | 2.38 | 34.5 |
| 29-1111.00 | 1.A.3.a.2 | Explosive Strength | IM | 1.38 | 9.5 |
| 29-1111.00 | 1.A.3.a.3 | Dynamic Strength | IM | 1.75 | 18.8 |
| 29-1111.00 | 1.A.3.a.4 | Trunk Strength | IM | 3.38 | 59.5 |
| 29-1111.00 | 1.A.3.b.1 | Stamina | IM | 2.63 | 40.8 |
| 29-1111.00 | 1.A.3.c.1 | Extent Flexibility | IM | 2.75 | 43.8 |
| 29-1111.00 | 1.A.3.c.2 | Dynamic Flexibility | IM | 1.13 | 3.3 |
| 29-1111.00 | 1.A.3.c.3 | Gross Body Coordination | IM | 2.63 | 40.8 |
| 29-1111.00 | 1.A.3.c.4 | Gross Body Equilibrium | IM | 1.63 | 15.8 |
| 29-1111.00 | 1.A.4.a.1 | Near Vision | IM | 3.63 | 65.8 |
| 29-1111.00 | 1.A.4.a.2 | Far Vision | IM | 2.13 | 28.3 |
| 29-1111.00 | 1.A.4.a.3 | Visual Color Discrimination | IM | 2.13 | 28.3 |
| 29-1111.00 | 1.A.4.a.4 | Night Vision | IM | 1 | 0.0 |
| 29-1111.00 | 1.A.4.a.5 | Peripheral Vision | IM | 1 | 0.0 |
| 29-1111.00 | 1.A.4.a.6 | Depth Perception | IM | 2.13 | 28.3 |
| 29-1111.00 | 1.A.4.a.7 | Glare Sensitivity | IM | 1 | 0.0 |
| 29-1111.00 | 1.A.4.b.1 | Hearing Sensitivity | IM | 2 | 25.0 |
| 29-1111.00 | 1.A.4.b.2 | Auditory Attention | IM | 2.38 | 34.5 |
| 29-1111.00 | 1.A.4.b.3 | Sound Localization | IM | 1 | 0.0 |
| 29-1111.00 | 1.A.4.b.4 | Speech Recognition | IM | 4 | 75.0 |
| 29-1111.00 | 1.A.4.b.5 | Speech Clarity | IM | 4 | 75.0 |
| 29-2031.00 | 1.A.1.a.1 | Oral Comprehension | IM | 4 | 75.0 |
| 29-2031.00 | 1.A.1.a.2 | Written Comprehension | IM | 3.38 | 59.5 |
| 29-2031.00 | 1.A.1.a.3 | Oral Expression | IM | 3.88 | 72.0 |
| 29-2031.00 | 1.A.1.a.4 | Written Expression | IM | 3.25 | 56.3 |
| 29-2031.00 | 1.A.1.b.1 | Fluency of Ideas | IM | 2.88 | 47.0 |
| 29-2031.00 | 1.A.1.b.2 | Originality | IM | 3 | 50.0 |
| 29-2031.00 | 1.A.1.b.3 | Problem Sensitivity | IM | 4 | 75.0 |
| 29-2031.00 | 1.A.1.b.4 | Deductive Reasoning | IM | 3.63 | 65.8 |
| 29-2031.00 | 1.A.1.b.5 | Inductive Reasoning | IM | 3.63 | 65.8 |
| 29-2031.00 | 1.A.1.b.6 | Information Ordering | IM | 3.63 | 65.8 |
| 29-2031.00 | 1.A.1.b.7 | Category Flexibility | IM | 3.13 | 53.3 |
| 29-2031.00 | 1.A.1.c.1 | Mathematical Reasoning | IM | 2.63 | 40.8 |
| 29-2031.00 | 1.A.1.c.2 | Number Facility | IM | 2.63 | 40.8 |
| 29-2031.00 | 1.A.1.d.1 | Memorization | IM | 2.75 | 43.8 |
| 29-2031.00 | 1.A.1.e.1 | Speed of Closure | IM | 2.75 | 43.8 |
| 29-2031.00 | 1.A.1.e.2 | Flexibility of Closure | IM | 3.13 | 53.3 |
| 29-2031.00 | 1.A.1.e.3 | Perceptual Speed | IM | 3.5 | 62.5 |
| 29-2031.00 | 1.A.1.f.1 | Spatial Orientation | IM | 1.13 | 3.3 |
| 29-2031.00 | 1.A.1.f.2 | Visualization | IM | 2.88 | 47.0 |
| 29-2031.00 | 1.A.1.g.1 | Selective Attention | IM | 3.38 | 59.5 |
| 29-2031.00 | 1.A.1.g.2 | Time Sharing | IM | 3 | 50.0 |
| 29-2031.00 | 1.A.2.a.1 | Arm-Hand Steadiness | IM | 2.88 | 47.0 |
| 29-2031.00 | 1.A.2.a.2 | Manual Dexterity | IM | 2.63 | 40.8 |
| 29-2031.00 | 1.A.2.a.3 | Finger Dexterity | IM | 3 | 50.0 |
| 29-2031.00 | 1.A.2.b.1 | Contol Precision | IM | 2.88 | 47.0 |
| 29-2031.00 | 1.A.2.b.2 | Multilimb Coordination | IM | 2.63 | 40.8 |
| 29-2031.00 | 1.A.2.b.3 | Response Orientation | IM | 2.38 | 34.5 |
| 29-2031.00 | 1.A.2.b.4 | Rate Control | IM | 1.88 | 22.0 |
| 29-2031.00 | 1.A.2.c.1 | Reaction Time | IM | 2.38 | 34.5 |
| 29-2031.00 | 1.A.2.c.2 | Wrist-Finger Speed | IM | 1.88 | 22.0 |
| 29-2031.00 | 1.A.2.c.3 | Speed of Limb Movement | IM | 2 | 25.0 |
| 29-2031.00 | 1.A.3.a.1 | Static Strength | IM | 2.38 | 34.5 |
| 29-2031.00 | 1.A.3.a.2 | Explosive Strength | IM | 1.13 | 3.3 |
| 29-2031.00 | 1.A.3.a.3 | Dynamic Strength | IM | 1.88 | 22.0 |
| 29-2031.00 | 1.A.3.a.4 | Trunk Strength | IM | 2.13 | 28.3 |
| 29-2031.00 | 1.A.3.b.1 | Stamina | IM | 2.25 | 31.3 |
| 29-2031.00 | 1.A.3.c.1 | Extent Flexibility | IM | 2.25 | 31.3 |
| 29-2031.00 | 1.A.3.c.2 | Dynamic Flexibility | IM | 1 | 0.0 |
| 29-2031.00 | 1.A.3.c.3 | Gross Body Coordination | IM | 2.25 | 31.3 |
| 29-2031.00 | 1.A.3.c.4 | Gross Body Equilibrium | IM | 2 | 25.0 |
| 29-2031.00 | 1.A.4.a.1 | Near Vision | IM | 3.88 | 72.0 |
| 29-2031.00 | 1.A.4.a.2 | Far Vision | IM | 2.88 | 47.0 |
| 29-2031.00 | 1.A.4.a.3 | Visual Color Discrimination | IM | 3 | 50.0 |
| 29-2031.00 | 1.A.4.a.4 | Night Vision | IM | 1.13 | 3.3 |
| 29-2031.00 | 1.A.4.a.5 | Peripheral Vision | IM | 1.13 | 3.3 |
| 29-2031.00 | 1.A.4.a.6 | Depth Perception | IM | 2.63 | 40.8 |
| 29-2031.00 | 1.A.4.a.7 | Glare Sensitivity | IM | 1 | 0.0 |
| 29-2031.00 | 1.A.4.b.1 | Hearing Sensitivity | IM | 2.88 | 47.0 |
| 29-2031.00 | 1.A.4.b.2 | Auditory Attention | IM | 2.63 | 40.8 |
| 29-2031.00 | 1.A.4.b.3 | Sound Localization | IM | 1.13 | 3.3 |
| 29-2031.00 | 1.A.4.b.4 | Speech Recognition | IM | 3.75 | 68.8 |
| 29-2031.00 | 1.A.4.b.5 | Speech Clarity | IM | 3.88 | 72.0 |

Step 4: Compute the mean values of the Standardized Values for each occupation and find their product.

Thus, taking as Standardized Values for Cardiovascular Technologists and Technicians (SOC 29-2031.00) as the X vector, we compute the mean value of the X vector:

$$\mu_x = \frac{\sum_{i}^{52}(x_i)}{52} \text{ to be } 46.4$$

And, taking Registered Nurses (SOC 29-1111.00) as the Y vector, we compute the mean value of the Y vector as:

$$\mu_y = \frac{\sum_{i}^{52}(y_i)}{52} \text{ to be } 39.1.$$

Step 5: Compute the variations of the values from their means and then, one by one, multiply the two variations, and finally sum their products.

$$\Sigma_{i=1}^{52}\{(x_i-\mu_x)(y_i-\mu_y)\}=24,035$$

Step 6: Compute the sums of the squared variations of the values from their means, multiply the two sums, and then extract the square root of the product.

$$\sqrt{(\Sigma_i^{52}(x_i-\mu_x)^2)(\Sigma_i^{52}(y_i-\mu_y)^2)}=$$
$$\sqrt{(22,689.58 \text{times} 34,118.43)}=27,823.24$$

Step 7: Compute the correlation coefficient which is the quotient of the values obtained in steps 5 and 6, i.e., $$\text{CORREL}(X,Y)=24,035/27,823.24=0.8638$$

Step 8: "Normalize" the correlation coefficient by multiplying it by 100 to produce the TORQ for Abilities Importance for these two occupations.

$$NORMCORREL_{Importance}^{Abilities} = 100 \text{ times } 0.8638 = 86.38$$

Comments on the Example:
Often, during the application of TORQ to problem situations, the occupation represented by the X vector is taken to mean the occupation from which workers could be transitioned to the occupation represented by the Y vector. In case, the analysis would be that of examining the congruence of Cardiovascular Technologists and Technicians (SOC 29-2031.00) and Registered Nurses (29-1111.00) with the idea of advancing the former (whose values are represented by the X vector) into the latter (whose values are represented by the Y vector).

2. As standard TORQ procedure, a computation of the correlation coefficient identical to that described in the example is also carried on using the CMDs of the two occupations and also only a subset of the Standard Values. That subset uses only those pairs of values for which the Standardized Values of the Y vector is greater than zero. In such a computation for these two occupations, we have $$NORMCORREL_{Importance}^{Abilities} = 100 \text{ times } 0.8286 = 82.86.$$

3. The TORQ computations compute one (or more when the non-zero subsets of the Standard Values are used) matrix of normalized correlation coefficients for each O*NET descriptor listed in Table 1 or CMD for which data values (e.g., for Level and Importance) exist in the O*NET database. As an example, for O*NET12, therefore, there are 801 occupations and coefficients such as those produced in this example must be produced for each pair of occupations. That means that there are $801^2=646,601$ cells in each matrix. The computations as described in this example are sufficient to fill a single cell in such a matrix.

4. To properly reflect probable asymmetries between the transferability of workers between any pair of occupations, the following adjustments are made to the correlation coefficients for each O*NET descriptor or Combined Multiplicative Descriptor ("the descriptor"). Let the symbol "d" denote a specific descriptor.

a. Denote the following:
  i. The "FROM" or "source" occupation is that from which it is proposed that one or more workers should be transferred.
  ii. The "TO" or "destination" occupation is that to which the aforementioned workers are to be transferred.
  iii. A equals the total number of attributes for the descriptor "d".
b. N equals the number of positive differences, i.e., the number of attributes (or "elements") of the given descriptor "d" for which the conventional CMD score of the "TO" occupation exceeds the value of the cross $CMD^{FT}$ for the "FROM-TO" pair of occupations.
  i. $P^+$ the percent of differences that are positive, i.e., N/A expressed as a percent.
  ii. $NORMCORREL^d$ equals the normalized simple correlation coefficient between the CMDs of the FROM and TO occupations, computed for the descriptor as described above herein.
  iii. $P^C$ equals the "Proximity Coefficient" which is the ratio of the sum of the scores of the "$CMD^{FT}$" occupation to the sum of the scores of conventional CMD of the "TO" occupation, but only for those attributes for which the score of the "TO" occupation exceeds that of the "FROM" occupation.
  iv. $\Delta$ equals $1-P^C$, i.e., One minus the Proximity Coefficient.
  v. $\Omega$ equals $1-P^+$, i.e., One minus the percent of differences that are positive.
  vi. $\Gamma$ equals $\Delta*\Omega$ which is the addition to be made to $P^C$.
  vii. $^AP^C$ equals $P^C+\Gamma$ which is the Adjusted Proximity Coefficient.
  viii. $TORQ^d$ equals $(NORMCORREL^d + {}^AP^C)$ which is the TORQ score for descriptor d properly adjusted to reflect the asymmetry of the reciprocal measures of transferability of workers between the FROM occupation and the TO occupation.

Comments and Observations on Usage and Interpretation of TORQ

Certain Abilities scores may be key limiting factors for the feasibility of occupational transfer. Some Abilities, unlike most Skills and Knowledge, are simply inherent qualities that are not responsive to training, education, or other adjustments. Some jobs require certain Abilities that constitute critical limiting factors. (The example of night vision for truck drivers is one such ability.) To generate a useful comparison between occupations, then, these limiting factors must be taken into account—in other words, these specific limiters must be observed along with the TORQ values in order to determine the utility of TORQ in assessing the feasibility of job transfer. (An individual accountant may have perfectly good night vision, rendering the comparison between the typical abilities of an accountant and a truck driver in this dimension irrelevant to the feasibility of his transition to become a truck driver.) A further dimension of the reporting systems associated with TORQ is in development to "flag" these limiting factors and screen them in a way that makes TORQ analysis more nuanced and more useful.

A related the point above—TORQ analysis generally yields the most useful results in job comparisons where relative Skills and Knowledge levels matter. Abilities, as already noted, tend to be less flexible for individuals than levels of skill and knowledge. (For example, doctors in general practice and those who perform surgery may have very closely comparable Skills, Knowledge, and even education levels. Some of the only vital distinguishing factors between these two may happen to be in the Level and Importance of manual dexterity required of a surgeon. Abilities TORQ analysis might therefore show that the feasibility of transfer between the general practitioner and the surgeon may be low, whereas an individual general practitioner may have all the manual dexterity she needs to facilitate a job change to surgeon. The same kind of comparison would hold true for two occupations in which Skills and Knowledge levels are comparably very low. Therefore, Skills and Knowledge TORQs are more useful to those seeking to assess training needs for job transfer, for reasons ranging from relocation of dislocated workers to recruitment of new job candidates from an existing labor pool.

Three Additional Analysis Steps

For more accurate calculations, additional analysis steps may be performed to the general TORQ analysis.

1) A method for using a computer to adjust the occupational attribute values imputed to an individual who has experience in one or more occupations based on the time he or she performed the occupation and the time elapsed since he or she worked in such an occupation;

2) A method for statistical analysis of the combined occupational attribute values of multiple past occupations, and for comparison of these composite attribute values with the attribute values of any other occupation; and 3) A method for the statistical evaluation of groups of workers based on combining, evaluating, and ranking the skill sets and other relevant attributes of all of the workers in a geographic area, industry, or other grouping, based on the occupations that these workers currently hold, or have previously held, or are projected to hold at some future time.

Analysis 1

A method for using a computer to statistically evaluate a set of occupational skills imputed to an individual who has experience in one or more occupations, taking into account changes in these skills as a result of time spent in the occupation or time elapsed since performing the occupation.

Individuals who have performed a range of tasks and work activities in a given occupation may be assumed to be competent in the skills required to do these tasks or activities. This assumed competency may decline over time if the individual ceases to perform the occupation, either because the competencies required for the occupation may change (for example, a heart surgeon may need to learn to use laser "scalpels" that were unknown during his or her medical residency) or because the individual may forget specific knowledge that is important to performance on the job (e.g., translating into a foreign language), or because the individual's abilities may decline with age (e.g., a driver whose night vision deteriorates). The rate at which such declines occur may vary based on factors such as how long the individual has held a job (and thereby learned the skills needed for the job), or how fast technology is changing in a given occupation. The total decline in an occupational competency may vary based on how long it has been since the individual left the occupation. The method described below integrates and statistically analyzes the impacts of these time factors.

Analysis 2

A method for statistical analysis of the combined occupational attribute values of multiple past occupations, and for comparison of these composite attribute values with the attribute values of any other occupation.

During the course of a lifetime, individuals may hold many jobs in various occupations that require different competencies and worker attributes. This multi-occupational history can be statistically analyzed and evaluated to provide a composite description of the occupational attributes that may be imputed to the individual based on his or her entire work history. This composite method involves selecting the highest of the adjusted values for an occupational attribute for each occupation an individual may have held.

A Mathematical Description of Analyses 1 and 2

Analysis 1 (which adjusts occupational attribute values based on time in, or away from an occupation) can be combined with Analysis 2 (which evaluates multiple past occupations) to create a method that provides a more accurate statistical description of the occupational attributes possessed by individuals with a particular work history. These more accurate statistical descriptions of individual occupational attributes can be used to evaluate the feasibility of transfers by individuals into new occupations based on the combined skills they have acquired and retained from previous occupations.

As described below, a combination of Analyses 1 and 2 is applied to data from the US Department of Labor O*NET databases that describe the Knowledge, Skills and Abilities of each occupation. The statistical method described in Analyses 1 and 2 can be used to evaluate any set of occupational attributes from any source for which there exist data that are specific to a set of occupations and for which work history dates are available. For example, the method could be used to evaluate and adjust occupational attributes relating to scores on cognitive or other work-related tests (e.g., the WorkKeys™ tests from ACT, Inc.), responses to personality questionnaires, educational achievement measured by years in school, or other criteria that are deemed to relate to occupational performance.

Mathematical Steps for Analyses 1 and 2 Applied to O*NET Data

The algorithm described herein, when implemented on a computer, computes a Composite O*NET Profile (COP) of any individual based on his or her personal work history. Once so computed, an individual's COP is passed to the TORQ algorithm which treats the COP data values just as it would the data values of a standard O*NET™ occupation. For example, a "standard" occupation is an occupation present in the O*NET database, e.g., Chief Executives which bears the O*NET-SOC code of 11-1011.00. The result for an individual worker is a set of TORQ scores measuring the transferability of that worker to any standard O*NET occupation, based on the Knowledge, Skills and Abilities accumulated and retained in the course of his/her personal work history.

The O*NET database contains data on a large number of occupations. The circa November, 2011 version of the O*NET database is called O*NET 16. There exist 1,109 occupational codes and titles in O*NET 16. The database contains Data Values for 862 of these 1,109 occupations. Those data consist of multiple sets of worker characteristics such as Knowledge, Skills, Abilities, and others. Each of these worker characteristics is composed of a set of defined elements. For example, the O*NET worker characteristic category "Knowledge" currently consists of 32 separate elements or bodies of knowledge, such as "Computers and Electronics" or "Biology." Similarly, the O*NET category for "Skills" includes 35 elements, such as "Active Learning" and "Programming," while the category for "Abilities" currently includes 52 elements, such as "trunk strength" and "oral comprehension." In the current O*NET 16 database, the worker characteristics categories of Knowledge, Skills and Abilities together include 119 elements.

Within the O*NET framework, each element of Knowledge, Skills, or Abilities is rated on two scales:
1. The first scale is "Level" which is abbreviated as "LV" indicating the degree of the element required by the occupation.
2. The second scale is "Importance" which is abbreviated as "IM" which indicates how important that element is to successful performance of the tasks associated with that occupation).

For most standard occupations in the O*NET database, there exist "Data Values" for these Level and Importance scales. In the cases of Knowledge, Skills and Abilities, each element of each occupation is assigned two data values, one each for the Level and Importance of this element that may be required to perform this occupation. They are defined as:

A "Level" Data Value: $L_l^o$
where "o" denotes a specific standard O*NET occupation and "l" denotes a specific element.
An Example: For the occupation entitled "Chief Executives," the data value for "LV" for the element "Computers and Electronics" is given as 3.6 in the O*NET 16 database on a scale that runs from 1 to 7.

An "Importance" Data Value: $I_l^o$
where "o" denotes a specific standard O*NET occupation and "l" denotes a specific element.
An Example: For the occupation entitled "Chief Executives," the value of "IM" for the element "Computers and Electronics" is given as 2.91 in the O*NET 16 database on a scale that runs from 0 to 5.

All Data Values are positive real numbers.

Standardization of Data Values

As noted above, the LV (Level) and IM (Importance) scales each have a different range of possible scores. Ratings on Level are rendered in O*NET originally on a 0-7 scale, ratings on Importance they are rendered originally on a 1-5 scale. To make reports generated by O*NET more intuitively understandable to users, these ratings may be standardized to a scale ranging from 0 to 100. The equation for conversion of original ratings to standardized scores is:

$$S=((O-L)/(H-L))*100$$

where S is the standardized score, O is the original rating score on an original scale, L is the lowest possible score on the rating scale used, and H is the highest possible score on the rating scale used. For example, an original Importance rating score of 3 is converted to a standardized score of 50 (50=[[3−1]/[5−1]]*100). For another example, an original Level rating score of 5 is converted to a standardized score of 71 (71=[[5−0]/[7−0]]*100).

The standardization equation provided here preserves the rank ordering and proportional positioning of Data Value scores. This is an essential attribute of any proper transformation. Let it be noted, however, that the COP algorithm described in this document works equally well with the original O*NET Data Value scores or with any transformation thereof. That means that the claim herein stands independently of any standardization or transformation of the original O*NET Data Value scores.

The Procedure and Algorithm of Computing a Composite O*NET Profile (COP)

TORQ's Composite Algorithm (CA") is a method for building a set of occupational characteristics that reflect the "work history" of a specific individual. It does this by evaluating and amalgamating the sets of requirements (i.e., the various sets "R") of all the occupations in the individual's work history.

Decay: In evaluating each of the elements, $r_i^k \in R^k$, attending a specific occupation, $A \in 0$, it is necessary to determine the degree to which an individual's proficiency may have deteriorated over the time that has elapsed since the individual was last occupied in occupation A. Consequently the CA applies one of several proprietary "element decay factors" or "EDFs" to reflect this deterioration.

Restore: TORQs' CA recognizes merit in the old adage that "practice makes perfect." That recognition underlies the "element restore factors" or "RSFs" that apply to each of the elements, $r_i^k \in R^k$, attending a specific occupation, $A \in 0$. The RSFs are functions of the duration of time that the worker was occupied in each occupation in which he/she was employed for some specific period in the past. Within the CA, the RSFs operate to restore or recover some portion of the decay due to the application of the EDFs.

Aggregation and standardization: After the EDFs and RSFs have been applied to each of the elements, $r_i^k \in R^k$, that attend each of the occupations in the individual's work history, the modified elements are aggregated to form a standardized composite profile of occupational characteristics that reflect that work history.

Submission to TORQ: The composite profile for the individual worker, obtained via the steps just outlined, is submitted to the TORQ algorithm for analysis just as if it were a conventional occupation in the set O. The results obtained from that analysis, however, correspond much more closely to the attributes possessed by the individual than would be the case if only a single current or most recent occupation were the point of analytical departure.

O*NET or WorkKeys . . . or both? In the current TORQ application, the composite profiles are developed on the basis of the O*NET database. However, there is no reason why the same proprietary algorithm could not be employed using WorkKeys data. Since individual assessment is an important component of the WorkKeys methodology, the assessment route could be a more accurate path to a result to match the attributes of a specific individual. O*NET-based CA works in combination with WorkKeys job profiling and assessment in delivering powerful tools for use by HR and other hiring managers in both the private and public sectors.

Preparatory Step 1: Compute the "Decay Factors" for all Elements

This step of the algorithm is taken before any COPs are generated. It is taken only once "in the background" for each version of the O*NET database.

Determine the Decay Function ("E") for each of the 119 elements that are scored in the O*NET database. For any given element the function is denoted generally as:

$$E_l^s = f_l^s(T)$$

where T is a positive integer variable denoting elapsed time measured in days, months, years or other standard measure of time; and
where s denotes the Level or Importance value; and
where l=1 . . . n with n denoting the total number of all elements in all the descriptors in the O*NET database being analyzed.
The computed values for $E_l^s$ are stored in TORQ's computerized database for later reference.

For example, if the data being analyzed were to comprise only Knowledge, Skills and Abilities, then n=(i+j+k)=52+35+32=119 in the current version of the O*NET database, i.e., O*NET16. However, this algorithm works for any data describing an attribute related to occupational performance that may change over time.

The function $f_i^s$ may be of any form including (without limiting the generality of the claim) linear, exponential, logarithmic, or the inverse of any of those. The determination of the form of the function $f_i^s$ and the values of any constants and parameters therein are determined by the application of expert analysis.

The logical purpose of developing the Decay Factors $E_i^s$ for all data values in all elements is to reflect either the erosion of the worker's competencies, e.g., skills, or the decline in the relevance of those skills because of changing tools or technology, either of which may occur when that worker has been away from a particular occupation for a given time period. The pace of such erosion may differ individually for each element.

A numerical example of the decay function may help to clarify.

Consider the "Level" of the element "Programming."

Suppose that $f_i^s(T)$ takes the specific form of $f_i^s(T)=T^0 e^{\lambda T}$ which is a form familiar as that which describes the radioactive decay of an isotope over time.

Where T is elapsed time, and where $T^0$ is where elapsed time equals zero, and where e denotes the natural logarithm, and where $\lambda$ is the "coefficient of decay."

Suppose, further, that the coefficient of decay, $\lambda$, for Programming is taken to equal −0.09 Plugging those values into the equation $f_i^s(T)=LV^0 e^{\lambda T}$ gives a the set of computed values for $E_i^s = f_i^s(T)$ that are shown in FIG. 4: Graph 1. This graph shows the percent of the original LV that has decayed after the passage of T years which are measured along the X axis. From Graph 1, it is shown that, given the form of the function and the value of −0.09 assigned to $\lambda$ (i.e., the "coefficient of decay"), half of the original LV score for Programming would have decayed in 7.70 years.

Preparatory Step 2: Compute the "Restore Factors" for all Elements and all Scale IDs This step of the algorithm is taken before any COPs are generated. It is taken only once "in the background" for each version of the O*NET database.

Determine the Restore Function ("R") for each data value for all elements. For any given element descriptor, the function "R" can be denoted generally as:

$$R_i^s = g_i^s(V)$$

where V is a positive integer variable denote in time measured in days; and where s denotes the element data value; and where l=1 . . . n with n denoting the total number of all elements in the database being analyzed.

The function g may be of any form including (without limiting the generality of the claim) linear, exponential, logarithmic, or the inverse of any of those. The determination of the form of the function g and the values of any constants and parameters therein are determined by the application of expert analysis.

The logical purpose of developing the Restore Factors is to recognize and "give credit" to a worker for the proficiency developed by practicing a given occupation for a shorter or longer period of time. It recognizes the principle of "practice makes perfect." The action of each Restore Factor "R" is to recover some of what has been lost by application of the Decay Function. The pace of such restoration may differ individually for each element.

A numerical example of the Restore Function may help to clarify.

Consider the "Level" of the element "Programming."

Suppose that $g_i^s(V)$ takes the specific form of $g_i^s(V)=1-(V^0 \div \beta^V)$ Where V is duration of time working in an occupation, and where $V^0$ is where duration of time equals zero, and where $\beta$ is the "coefficient of restoration."

Suppose, further, that the coefficient of restoration, $\beta$, for Programming is taken to equal 1.15

Figure 5:
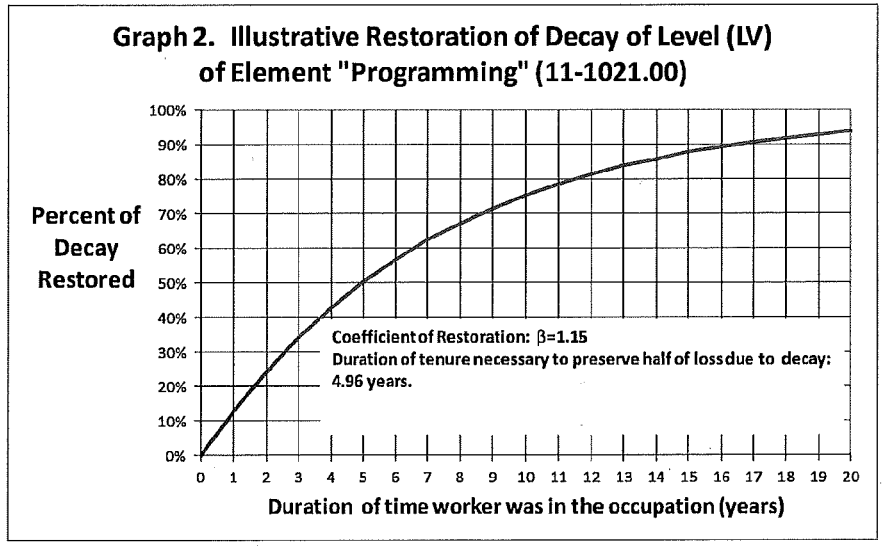
FIG. 5 is the percent of the decayed value of LV that will be "restored" by the algorithm after the passage of V years on the job which are measured along the X axis.

Plugging those values into the equation $g_i^s(V)=1-(V^0 \div \beta^V)$ gives a the set of computed values for $R_i^s = g_i^s(V)$ that are shown in FIG. 5, Graph 2. This graph shows the percent of the decayed value of LV that will be "restored" by the algorithm after the passage of V years on the job which are measured along the X axis. From Graph 2, it is shown that, given the form of the function and the value of 1.15 assigned to $\beta$ (i.e., the "coefficient of restoration"), half of the original amount of the decayed LV score would be "restored" in 4.96 years.

These computed values for $R_i^s$ are stored in TORQ's computerized database for later reference.

Application Step 1: Input the Individual's "Work History."

This step is performed each tune that an individual worker employs TORQ and wishes it to incorporate his/her COP, i.e., to recognize the competencies that he/she may have accumulated while performing more than a single occupation.

To compute an individual's COP, the algorithm requires the input of that individual's "Work History." The Work History comprises a listing of one or more occupations that the individual holds now or has held in the past.

The algorithm requires that the individual should enter at least one such occupation in his/her work history. Typically, that will be an occupation in which the individual is now occupied or has recently been occupied if he/she is now unemployed. Optionally, the individual may enter additional occupations that he/she holds or may have held in the past.

The Work History also requests entries for the dates at which the individual began to work in each occupation listed ("Begin date"). If the individual is no longer employed in the occupation, then the Work History also includes the date at which employment in that occupation ceased ("Stop date"). The Begin and Stop dates must include, at a minimum, the year in which employment in the occupation began and ceased (if it has ceased). It may also include the day and month for each.

Application Step 2: Compute the Time Elapsed

The algorithm next computes the Time Elapsed for this individual since employment ceased in each occupation listed in the work history.

Denote as follows:

T° is the date at which the COP is being prepared and the algorithm being run.

$B^p$ is the Begin date for occupation "p" (All dates are converted into integer format. Conventionally, this is done by computing the number of days elapsed since Jan. 1, 1900. Thus, the date for Jan. 1, 1900 is rendered as "1" while Nov. 4, 2011 is rendered as "40850.")

$S^p$ is the Stop date (note that if the individual is still employed in the occupation "p", then this is the present date).

$E^p$ is the time elapsed since employment ceased in each occupation and $$E^p = T^o - S^p$$

Application Step 3: Compute the Duration on the Job

The algorithm next computes the Duration that the individual was on the job for each occupation in the work history.

Denote Duration on the job for occupation "p" as $D^p$

Then, $D^p = S^p - B^p$

Application Step 4: Retrieve the Data Values

Look up from the O*NET database the Data Values for each element of all descriptors for each occupation the individual's Work History.

For example, the O*NET original "Level" Data Value for Skills element "Judgment and Decision Making" for the occupation "Chief Executives" (Code 11-1011.00) is 5.625.

Standardized as described earlier in this document, that score becomes 80.36. Comparable Data Values would be looked up for each of the other 118 elements shown in the O*NET16 database for this occupation. The same would be done for each occupation in the individual's Work History.

Application Step 5: Apply the Decay Factors

Apply the Decay Factors to the Data Values of each Scale ID score for each element in each occupation in the Work History to produce the Raw Decayed scores.

For every Data Value for each element in each occupation included in the Work History, this is done by looking up the previously computed and stored value for $E_i^s = f_i^s(T)$ where T is set equal to $E^p$. That looked-up number is the percentage of the original O*NET Data Value (ODV) lost due to decay. The amount of that loss is $E_i^s$ times ODV and that loss is symbolized as LDV.

The result of applying the Decay Factors is a vector "R" containing LDVs for every element in each occupation in the individual's Work History. For example, if the characteristics being considered included only Knowledge, Skills and Abilities and only "Level" Data Values were being decayed, then the vector R would include 119 LDVs.

Application Step 6: Apply the Restore Factors to Produce a Set (Vector) of Net Adjusted Data Values.

Apply the Restore Factors to the LDVs scores to determine how much of the "decay" should be "restored" due to the individual worker's longevity in the job in each occupation. For every Data Value of each Scale ID for each element in each occupation included in the Work History, this is done by looking up the previously computed and stored value for $R_i^s = g_i^s(V)$ where V is set equal to $D^p$ and adjusting the Raw Decayed Score to produce the Net Adjusted Data Value (NADV) according to the following equation:

$$NADV = ODV - LDV(1 - R_i^s)$$

The NADVs comprise a vector N. Continuing our previous example, if the characteristics being considered included only Knowledge, Skills and Abilities and only "Level" Data Values were being decayed, then the vector N would include 119 NADVs. After this step is completed for each occupation, the computed values of the NADVs are then stored in TORQ's computerized database.

Application Step 7: Select the Maximum Values of the NAVDs

At this point, the TORQ computerized database has a set of NADV vectors, each containing the Net Adjusted Data Values for each element in each occupation included in the Work History.

The final step in preparing the COP for an individual is to select the maximum NAVD for each element. That set of maximum scores comprises the Composite O*NET Profile (COP) for the specific individual whose personal work history has been submitted to the algorithm described herein. Examples of the Results of Analyses 1 and 2

The impacts of these analyses to the statistical methods described in patent application Ser. No. 12/318,374 may be seen in a set of hypothetical examples comparing three job seekers using the TORQ algorithms. All three have been retail sales clerks. One (called Ann) has held only one job in retail sales and holds it currently. The second (Beth) is also currently a retail sales clerk, but has also recently held jobs as a home health aide, and an occupational therapist aide. The third (Carol) has held the same jobs as Beth, but has been out of the workforce for the past 7 years raising her children. When these employment histories are entered into the TORQ algorithm, the occupations and opportunities suggested by the algorithm vary substantially.

Ann (Recent experience only in retail sales)

| Occupation Title | Grand TORQ | Median Wage |
|---|---|---|
| Retail Salespersons | 100 | |
| Telemarketers | 95 | $23,027 |
| Customer Service Representatives | 92 | $30,696 |
| Counter and Rental Clerks | 92 | $26,798 |
| Receptionists and Information Clerks | 92 | $24,747 |
| Telephone Operators | 91 | $28,193 |
| Mail Clerks and Mail Machine Operators, Except Postal Service | 91 | $24,403 |
| Demonstrators and Product Promoters | 91 | $24,197 |

Filters applied: [Grand TORQ (80-100)×][Median Wage ($22k-$33k)×]
48 occupations found on the short list Beth (Recent experience in retail, occupational therapy and home health)

| Occupation Title | Grand TORQ | Median Wage |
|---|---|---|
| Retail Salespersons | 100 | |
| Skin Care Specialists | 97 | $29,518 |
| Telemarketers | 97 | $23,027 |
| Customer Service Representatives | 96 | $30,696 |
| Counter and Rental Clerks | 96 | $26,798 |
| Physical Therapist Aides | 96 | $23,716 |
| Occupational Therapist Aides | 96 | |
| Weighers, Measurers, Checkers, and Samplers, Recordkeeping | 95 | $29,728 |
| Receptionists and Information Clerks | 95 | $24,747 |

Filters applied: [Grand TORQ (80-100)×][Median Wage ($22k-$33k)×]
99 Occupations found on the short list Carol (Experience in retail sales, home health and occupational therapy aide, but out of the workplace for 7 years)

| Occupation Title | Grand TORQ | Median Wage |
|---|---|---|
| Retail Salespersons | 87 | |
| Mail Clerks and Mail Machine Operators, Except Postal Service | 92 | $24,403 |

| Occupation Title | Grand TORQ | Median Wage |
| --- | --- | --- |
| Skin Care Specialists | 91 | $29,518 |
| Weighers, Measurers, Checkers, and Samplers, Recordkeeping | 90 | $29,728 |
| Telemarketers | 90 | $23,027 |
| Customer Service Representatives | 89 | $30,696 |
| Medical Records and Health Information Technicians | 89 | $30,638 |
| Counter and Rental Clerks | 89 | $26,798 |
| Receptionists and Information Clerks | 88 | $24,747 |

Filters applied: [Grand TORQ (80-100)×][Median Wage ($22k-$33k)×]
55 Occupations found on the short list These examples demonstrate that capturing the Knowledge, Skills and Abilities of multiple past occupations expands the array of occupations that are highly rated by the algorithm as feasible transfers. In addition, capturing time spent in the occupation and time away from the occupation has an impact on the ratings of the feasibility of occupational transfers. Thus, Ann, whose only occupational experience is her current job in retail sales, has fewer highly rated potential transfers compared with Beth, who has recent experience in multiple occupations. On the other hand, Carol, whose job history is identical to Beth's, but who has not performed these occupations for many years, is scored lower by the TORQ algorithm evaluating the feasibility of transfers to other occupations.

In summary the Level values for each element of each occupation may be adjusted based on the length of time the individual worked in the occupation, and by the period of time since the individual last actively performed the occupation to reflect the degree to which the attribute can be assumed still to characterize the individual. For example a computer programmer with five years experience may be assumed to have mastered programming skills (captured in O*NET as the "programming" skill) to a greater degree than one who has been a computer programmer for six months. Similarly, a computer programmer who has not been employed in that occupation for five years may be assumed to have lower levels of programming competency than an individual who is currently employed as a programmer. By selecting the highest value for each adjusted element value after considering these factors relating to time, an individual's overall profile of KSA elements can be assembled. Then, a comparison between an individual's element Level scores and the O*NET element Level scores required for a given occupation, can provide a mathematical evaluation of the feasibility of the individual successfully performing that given occupation.

Analysis 3

A method for the statistical evaluation of groups of workers based on evaluating and combining the skill sets and other relevant attributes of all of the workers in a geographic area, industry, or other grouping, based on the occupations that these workers currently, or most recently held.

The method for statistical evaluation of the Knowledge, Skills and Abilities of individual workers can be applied to groups of workers. If the number of workers currently (or recently) employed in each occupation within any group is known, then the data values for worker attributes derived by the TORQ algorithm for individuals can be summed across any relevant group or sub-group of workers to describe the overall characteristics of that group, and to compare that group with other groups.

As described below, Analysis 3 is applied to data from the US Department of Labor O*NET databases that describe the Knowledge, Skills and Abilities of each occupation for specific geographical subdivisions of the US. The statistical method described in Analysis 3 can be used to evaluate any set of occupational attributes from any source for which there exist data that are specific to a set of occupations, and to evaluate any group or subgroup of workers for whom occupations are known and attribute data values for each occupation are known.

Mathematical Steps for Analysis 3 Applied to O*NET Data

The algorithm described in this claim, when implemented on a computer, describes a Talent Quality Index (TQI) of any state or region (hereafter, "area") in the United States for which detailed occupational employment data are available. Without limiting the generality of this claim, an example of such a data set would be the annual occupational employment data produced by the Occupational Employment Survey (OES) that is conducted annually by the U.S. Bureau of Labor Statistics (BLS) and/or the state-level agencies responsible for the collection of labor market information (LMI). Once computed, an area's TQI can be the basis for computing several relevant comparisons. Examples of these comparisons, without limiting the generality of the claim, include:

Comparisons of the TQIs of any given geographical area with the TQIs of other areas (cross-geographical comparisons);

Comparisons of the TQIs of a given area at one point in time with the TQIs of that same area at other points in time (inter-temporal comparisons);

Comparisons of the TQI of a given area at one point in time (e.g., the most recent year for which the aforesaid occupational employment data are available) with the TQI implied by the projected occupational employment for some future year;

Comparisons of the TQI of a given area at one point in time (e.g., the most recent year for which the aforesaid occupational employment data are available) with the TQIs implied for one or several industries or clusters of industries for which occupational employment data are available.

Comparisons of the TQI associated with one portion of a given area's workforce (e.g., the unemployed, or those occupations that have declined in size over a particular period) with another portion of that same area's workforce (e.g., those still employed, or those occupations that have grown in size over a particular period).

Additionally covered by this claim is the ranking of areas within a set of areas according to their TQIs. Thus, without limiting the generality of the claim, all of the states can be ranked according to their TQIs. The same is true of Metropolitan Statistical Areas (MSAs) as defined by the U.S. Census Bureau.

The data necessary for the computation of the TQI of any area are, in addition to detailed occupational data as specified above, a set of descriptors of qualitative requirements or desirable characteristics to match each of the occupations entering into the TQI calculation. An example of such a set of descriptors, without limiting the generality of this claim, would be the Level scores for Knowledge, Skills, and Abilities that are provided for each occupation in the O*NET™ database.

A Concrete Illustration of the TQI Algorithm

To provide concrete illustration of the TQI algorithm, but without limiting the generality of the claim, here is a descriptive example of the TQI algorithm that is based on data contained in the O*NET database and the OES data from the BLS.

The Procedure and Algorithm for Computing the TQI
Terminology:

For the United States as a whole ("the nation") in year "y" there are employment data on "$^y n_u$" detailed occupations. Then let:

$E_i^{y,u}$ denote the number of persons employed nationally in occupation "i" in year "y" where i=1 . . . $^y n_u$.

For each sub-national area "s" in year "y" there are employment data on "$^y n_s$" detailed occupations. Then let:

$E_j^{y,a}$ denote the number of persons employed in area "a" in occupation "j" in year "y" where j=1 . . . $^y n_a$.

Each occupation in the OES databases for all areas is coded according to a common coding system, the "Standard Occupational Code" (SOC).

For most occupations in the O*NET database, there exist two "Data Values" for each element of Knowledge, Skills and Abilities. These are:

A "Level" Data Value: $L_l^o$
where "o" denotes a specific O*NET occupation and "l" denotes a specific element.
An Example: For the occupation "Chief Executives," the "LV" for the element "Computers and Electronics" is given as 3.6 in the O*NET 16 database on a scale that runs from 1 to 7.

An "Importance" Data Value: $I_l^o$
where "o" denotes a specific orthodox O*NET occupation and "l" denotes a specific element.
An Example: For the occupation entitled "Chief Executives," the element "Computers and Electronics" is given as 2.91 in the O*NET 16 database on a scale that runs from 0 to 5.

All Data Values are positive real numbers.

Step 1: Compute the Weighted KSA Average for the United States 1.1 Download or otherwise obtain and store the most recent OES data from the BLS.
Illustration: For the 2010 OES data, that would be the "National Cross-Industry" table, i.e., the list below:
Current Tables: May 2010 estimates
   National Cross-Industry
   State Cross-Industry
   Metropolitan and Nonmetropolitan Area Cross-Industry
   Metropolitan and Nonmetropolitan Area Estimates listed by country or town
   National sector, 3-, 4-, and 5-digit NAICS Industry-Specific
   National by Ownership
   List of occupations in alphabetical order 1.2 Download and store the most recent O*NET database.

1.3 Retrieve from storage the previously obtained National Cross-Industry data OES data (the "national data"). For each SOC-coded occupation, that file will contain $E_i^{y,u}$.
Example: For 2010 OES, that will be the set $E^{2010,u}$ such that $E_i^{2010,u} \epsilon E^{2010,u}$ for all i=1 . . . 796 (i.e., for all detailed occupations). The 2010 OES occupational employment data for the first five detailed occupations are as shown the column headed "TOT EMP" below:

| OCC Code | OCC Title | Group | TOT EMP |
|---|---|---|---|
| 11-1011 | Chief Executives | | 273,500 |
| 11-1021 | General and Operations Managers | | 1,708,080 |
| 11-1031 | Legislators | | 65,710 |
| 11-2011 | Advertising and Promotions Managers | | 32,240 |
| 11-2021 | Marketing Managers | | 164,590 |

Figures 6, 7:
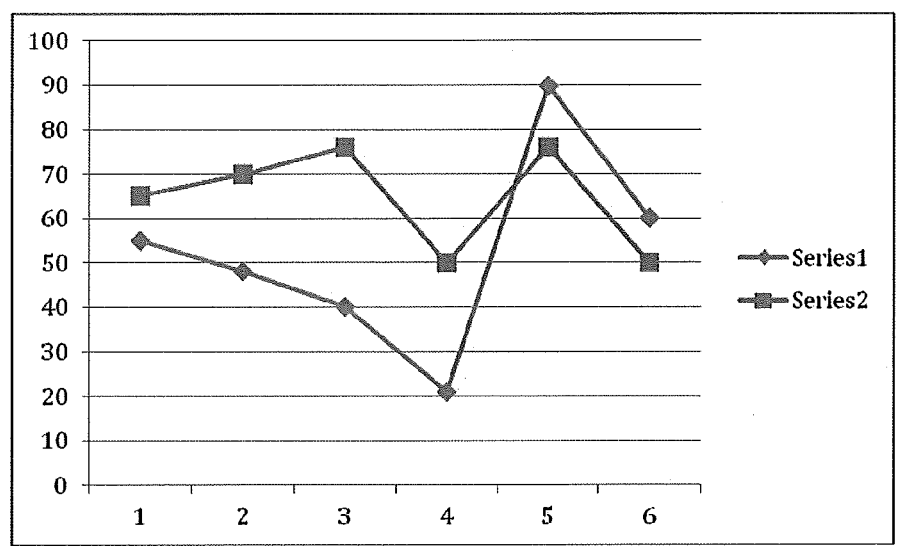
FIG. 6 is the numbers for $L_t^o$ for the first five occupations in O*NET 16.
FIG. 7 is a gap analysis graph.

1.4 Retrieve from storage the previously downloaded O*NET database. From that database, extract the "Level" Data Value: $L_l^o$ for all occupations in that database for the descriptors Knowledge, Skills, and Abilities.
Example: The numbers for $L_l^o$ for the first five occupations in O*NET 16 are as shown in the column labeled "Data Value" in FIG. 6.

1.1 Compute the "weighted average" of each element "l" of the descriptors Knowledge, Skills and Abilities for the nation by multiplying the Data Value for element "l" in each occupation by the number of persons employed in each of the occupations, summing those products, and then dividing that sum by the total number of persons employed in all those occupations. Symbolically, $$(WA)_l^{y,u} = [\Sigma_i^N (E_i^{y,u} \times L_l^i)] \div \Sigma_i^N (E_i^{y,u})$$

where N=$^y n_u$, i.e., the number of detailed occupations in the national table of the particular year of OES being used and as defined earlier herein. For example, in OES 2010 that number would be 796.

When this computation is completed for all elements, the result is a vector set of weighted averages of all the elements in the descriptors Knowledge, Skills and Abilities. Symbolically, the result is the set $(WA)^{y,u}$ such that $(WA)_l^{y,u} \epsilon (WA)^{y,u}$. As an illustrative example, the case of O*NET 16, the number of elements in the set $(WA)^{y,u}$ would be 119.

Step 2: Compute the Weighted KSA Average for One or More of the Sub-National Areas.

Compute the "weighted average" of each element "l" of the descriptors Knowledge, Skills and Abilities for each sub-national area "j" in a manner similar to that just described for the nation. That is by multiplying the Data Value for element "l" in each occupation in area "j" by the number of persons employed in each of the occupations in area "j", summing those products, and then dividing that sum by the total number of persons employed in all those occupations in area "j". Symbolically, for each, $$(WA)_l^{y,j} = [\Sigma_i^{A,j} (E_i^{y,j} \times L_l^i)] \div \Sigma_i^{A,j} (E_i^{y,j})$$

where (A,j)=$^y a_m$ (as previously described) for the area "j", i.e., the number of detailed occupations in the OES table for area "j" of the particular year of OES (or similar data from state LMI agencies or private sources) being used. That number varies from area to area and may vary from year to year for any given area.

When this computation is completed for multiple areas and all elements, the results comprise a matrix of weighted averages of all the elements in the descriptors Knowledge, Skills and Abilities for each of those multiple areas. That matrix would be of dimension K×L where K denotes the number of areas and L denotes the number of elements (119 in O*NET 16). Currently the OMB and Census Bureau number 362 MSAs and 577 Micropolitan Areas. This claim covers not only these areas but also any other geographical area for which detailed occupational data have been available, are available now or may become available in the future.

Step 3: Compute the Talent Quality Index for One or More of the Sub-National Areas.

The final step in computing the TQI for any given area j in a given year is to divide the weighted averages of all KSA elements in that area by the comparable weighted average of the nation as a whole. Symbolically, that is $$(TQI)_{j,t}^{y} = (WA)_{j,t}^{y,a} \div (WA)_{t}^{y,u}.$$

Summary of TQI Analysis Steps:

Analytically, the TQI is useful in two main ways:
1. For workforce and/or economic development:
    Assess the quality of an area's workforce in terms of its Knowledge, Skills and Abilities. These, of course, are O*NET categories. However, it is possible to apply the same TQI methodology on the basis of area employment estimates and WorkKeys job profiles.
    Identify the strengths and weaknesses of an area's workforce;
    Compare an area's workforce quality with that of other areas in the nation;
    Benchmark an area's workforce to what's needed to achieve defined economic development targets;
    Evaluate how an area's workforce quality is changing over time;
    Match different areas' workforce quality against target industries or clusters.
2. For site selectors or companies seeking areas in which to locate or expand operations:
    Evaluate which of several different areas posses talent mixes that well correspond to that needed by a client company or the operation in question.

At its core, TORQ's Talent Quality Index (TQI) is a variation on what is commonly known as "Location Quotient Analysis" (or "LQA"). LQA is commonly used in regional economics to explicate the relative concentration of various industries in some particular area. TORQ's TQI redirects the analysis to focus on the relative concentration of various workforce attributes ($r_i^k \epsilon R^k$) in each region. TORQ's proprietary TQI algorithm presently operates with jurisdictional employment data together with O*NET KSA data in the following manner:

Posit that there are n occupations in U (the entire nation) among which all workers are distributed such that each worker is counted in one and only one occupation. Suppose, further, that there exist proper subsets of those occupations in all areas of interest (states, metro area, etc.).

I. Then let:
II. $J_j^i$ denote the number of workers in the $i^{th}$ occupation in the entire nation. i=1 . . . n
III. $S_j^i$ denote the number of workers in the $i^{th}$ occupation in the $j^{th}$ state. i=1 . . . n; J=1 . . . 51
IV. $M_l^i$ denote the number of workers in the $i^{th}$ occupation in the $l^{th}$ metro area i=1 . . . n; l=1 . . . 394
V. In O*NET™ 15 database, there exist, for each of the n occupations, the following: 32 "Knowledge elements;" 35 "Skills elements;" and 52 "Ability elements;"." Furthermore, corresponding to each of these "elements" there exists a range of numeric "Values" that may range from 0 to 100.
VI. Then let:
VII. $V_k^i$ denote the value of the $k^{th}$ Knowledge element of the $i^{th}$ occupation. k=1 . . . 32
VIII. $V_s^i$ denote the value of the $s^{th}$ Skills element of the $i^{th}$ occupation. s=1 . . . 35
IX. $V_a^i$ denote the value of the $a^{th}$ Ability element of the $i^{th}$ occupation. a=1 . . . 52
X. $Q_k^j$ denote the TORQ Talent Quality Index of the $k^{th}$ Knowledge element for the $j^{th}$ state. J=1 . . . 51
XI. $Q_s^j$ denote the TORQ Talent Quality Index of the $s^{th}$ Skills element for the $j^{th}$ state. J=1 . . . 51
XII. $Q_a^j$ denote the TORQ Talent Quality Index of the $a^{th}$ Ability element for the $j^{th}$ state. J=1 . . . 51
XIII. $Q_k^l$ denote the TORQ Talent Quality Index of the $k^{th}$ Knowledge element for the $l^{th}$ metro area. l=1 . . . 394
XIV. $Q_s^l$ denote the TORQ Talent Quality Index of the $s^{th}$ Skills element for the $l^{th}$ metro area. l=1 . . . 394
XV. $Q_a^j$ denote the TORQ Talent Quality Index of the $a^{th}$ Ability element for the $l^{th}$ metro area. l=1 . . . 394
XVI. Then compute the TORQ Talent Quality Index for the jth state and the kth Knowledge element as follows:
XVII.

$$Q_k^j = \sum_{i=1}^{i=n} [(V)_k^i \cdot S_j^i] \div \sum_{i=1}^{i=n} [(V)_k^i \cdot U^i]$$

XVIII. And compute the TORQ Talent Quality Indexes for all the other all the areas and all the other elements in an analogous manner.

Examples of the Outputs from Analysis 3

The table below summarizes an analysis of nine metropolitan areas using the TORQ Analysis 3 algorithm described above. It describes the set of Knowledge, Skills and Abilities of each metropolitan area compared to the set of Knowledge, Skills and Abilities required of workers in manufacturing industries. The table summarizes and ranks the workforces of each metro area based on whether its workforce is better or worse matched to the optimum set of Knowledge, Skills and Abilities needed in manufacturing.

| Metro Area | Abilities TORQ | Skills TORQ | Knowledge TORQ | Grand TORQ |
| --- | --- | --- | --- | --- |
| Evansville, IN-KY | 97 | 94 | 88 | 93 |
| Rockford, IL | 96 | 93 | 88 | 92 |
| Green Bay, WI | 96 | 93 | 86 | 92 |
| Davenport-Moline-Rock Island, IA-IL | 95 | 92 | 86 | 91 |
| Peoria, IL | 94 | 90 | 82 | 89 |
| Champaign-Urbana, IL | 93 | 90 | 80 | 88 |
| San Jose-Sunnyvale-Santa Clara, CA | 90 | 86 | 86 | 87 |
| Bloomington-Normal, IL | 91 | 86 | 82 | 86 |
| Springfield, IL | 92 | 87 | 78 | 86 |

NB: The measures of congruence are based on the TORQ ™ score of each region's workforce versus the target industry. TORQ ™ is a proprietary product of Workforce Associates, Inc.

By computing the total attribute values for populations, it is also possible to derive the deviations from these values that characterize subsets of these populations, based on the incidence of specific individual attributes (e.g., nursing skills) or groups of attributes (e.g., mathematical knowledge).

For example, mathematical summaries of the attributes of groups of workers or jobs may be used to:
Determine which location (city, region, nation) would have a workforce with attributes most suited to the needs of a given employer relocating to a new area;
Determine what educational investments may be needed in a geographical region to attract employers from specific industries;
Determine with precision the degree to which the population of unemployed workers may differ from the requirements of jobs available in a given area, and to prescribe specific remediation or employment strategies.

The TORQ Algorithm

The Algorithm Itself:

TORQ is all about "transferability." Here "transferability" is taken to be the ease (or difficulty) that a worker who is fully and exactly competent in one occupation (occupation "A") would experience if he/she were to "transfer" to work in another occupation (occupation "B"). Here, both occupations "A" and "B" can be any two among a set of occupations (the set "O") for which quantitative data exist describing the common requirements (the set "R") for all occupations in O. Each member of R (i.e., $R^k \in R$) may contain a sub-set $r_i^k \in R^k$ of "elements" that comprise more granular measures of worker attributes. The TORQ algorithm juxtaposes the aforementioned data on all elements of R for each and every pair of occupations (A∈O and B∈O) to produce:

a. A set of scores ($s_{AB}^j \in S^j$) that measures the degree of transferability of workers in occupation A to occupation B with reference to each of the j=1 . . . n requirements in R. Colloquially, these are described as the "mini-TORQ scores."

b. A weighted average $$G_{AB} = \left(\sum_{1}^{n} w_j s_{AB}^j\right) \div n$$

is computed to yield a "Grand TORQ" score.

c. A raw ranking of all occupations in A and B in O corresponding to their $G_{AB}$, i.e., according to their Grand TORQ scores.

d. A filtering of the raw ranked Grand TORQ scores according to a set of criteria to more narrowly focus the TORQ user's attention on occupational transfers that meet other desiderata. Alternatively, one or more of these other desiderata may be included among the requirements, R, taken into account during the calculation of the Grand TORQ score itself.

These may include for each of the occupations in O:
a. The level of education and experience required;
b. The various work activities, contexts, values and styles normally attending each occupation;
c. The licenses and certifications required for in various jurisdictions;
d. The level of compensation normally prevailing in the user's locale;
e. The availability of job opening within user-defined regions;
e. An analysis of the degree to which each $R_i^k \in R^k$ of the "From" occupation (i.e., occupation B in this example) may fall short of that required for the "To" occupation (i.e., occupation A in this example). Colloquially, this is TORQ's "Gap Analysis."

The identification of significant "gaps" can identify specific elements among the requirements that warrant special attention and/or assessment in the cases of specific individuals. Similarly, Gap Analysis can point up areas of deficiency which may be amenable to additional training and/or education.

General Algorithm for Computing the Mini-TORQ Scores and then the Grand TORQ Score 1. Within the O*NET database, there currently exist more than 850 occupations with required Data Values. In the general case,
   let the number of occupations in the O*NET database be denoted by the letter "m."

2. For each of the m occupations, there exist three sets of worker characteristics or requirements which are
   a. A set of Abilities "elements." Currently there are 52 of these in the O*NET database but our claim stands independently of the actual number there may be in any version of the database.
   b. A set of Skills "elements." Currently there are 35 of these in the O*NET database but our claim stands independently of the actual number there may be in any version of the database.
   c. A set if Knowledge "elements." Currently there are 32 of these in the O*NET database but our claim stands independently of the actual number there may be in any version of the database.
   d. The word "Descriptor" is used as a generic term to denote any one of the aforementioned three sets (Abilities, Skills and Knowledge).
   e. Our algorithm computes a "mini-TORQ" score for each Descriptor. The same algorithm is employed for each of the three Descriptors and it is that General Algorithm that is described below and which this claim is intended to cover.

3. Each Descriptor element has two vectors of data:
   a. A vector of "Level" scores: $V_i^a$ i=1 . . . n,
      i. where "n" is the number of elements pertaining to the Descriptor in question (i.e., currently 52 for Abilities; 35 for Skills; and 32 for Knowledge)
   b. A vector of "Importance" scores: $I_i^a$ i=1 . . . n
   These scores are positive real numbers.

4. In TORQ, we typically analyze the pair-wise "transition" of workers from a "FROM" occupation to a "TO" occupation where both the FROM and TO occupations may be any pair from among the 854 (or whatever number of occupations there may be in the current version of O*NET database).

Let:
$^f V_i^a$=Level score of Descriptor element "I" for the FROM occupation "f."
$^f I_i^a$=Importance score of Descriptor element "I" for the FROM occupation "f."
$^t V_i^a$=Level score of Descriptor element "I" for the TO occupation "1 . . . t."
$^t I_i^a$=Importance score of Descriptor element "I" for the TO occupation "t."
Where
i=1 . . . n;
t=1 . . . 854 (for O*NET 15); and
t=1 . . . 854 (for O*NET 15).

5. Product Vectors:
Fundamental to all TORQ computations are two types of vector multiplications:
   a. "To-To" vectors, one for each of the m occupations. Each member of this vector is the product defined as follows:

$$TT_i^a = {}^t V I_i^{a*} {}^t I_i^a$$

b. "From-To" vectors, one for each of the (m²-m) pairs of i-to-j pair of occupations. Each member of this vector is the product defined as follows:

$$FT_i^a = {}^f V_i^{a*} {}^t I_i^a$$

6. Gap Vectors, one for each of the (m²-m) i-to-j pairs of occupations. Each member of this vector is the product defined as follows:

$$G_i^a = TT_i^a - FT_i^a$$
$$= ({}^t I_i^a *{}^t I_i^a) - ({}^f I_i^a *{}^t I_i^a).$$

7. Sum the Positive Gaps. Now, for each pair of occupations, compute the sum of the positive gaps:

$$\sum_{i=1...n}^{G_i^a>0} G_i^a = \sum_{i=1...n}^{>0} [(^tV_i^a *^t I_i^a) - (^fV_i^a *^t I_i^a)]$$

The step of aggregating the resulting values comprises computing the value of the Level times the value of the Importance of each worker attribute, and comparing these computed products for each attribute between any pair of occupations. The differences between occupations for these computed products for each attribute, which could be called skill gaps, are summed for all attributes of any two occupations to produce a single value summarizing the total difference between the sums of all the computed products, provided that each difference for two computed products for a given attribute is only considered and added to the sum of the gaps between any two occupations to the extent that the computed product for the target occupation exceeds the computed product of the source occupation. This method of ignoring higher source computed product values prevents "over-qualification" on one attribute from compensating for under-qualification on another.

A graphical representation of this method describes the area of skill gap under the curve of the attribute values of the target occupation. Thus in FIG. 7, if the Series 1 line represented the attribute scores of the source occupation, and the Series 2 line represented the attribute scores of the target occupation, the sum of the gaps number 1-4 between the Series 1 line and the Series 2 line would be the total skill gap. If the transition were from the Series 2 occupation to the Series 1 occupation, gaps 5 and 6 would be summed to represent the total skill gap between the red source occupation and the blue target occupation.

This type of gap analysis is an important supplement to the use of correlation coefficients, because it reflects more accurately the difficulty of acquiring more advanced skills in occupations that may have similar patterns of skills. For example, a doctor and a nurse may have highly correlated sets of Knowledge and Abilities, but the levels of each attribute may vary greatly. So a pure correlation based analysis of the skills required to move from being a nurse to being a doctor might suggest a very easy transition. But in fact, while it is generally feasible for a doctor to become a nurse, the opposite transition may require many additional years of study and certification, as shown by gap analysis.

8. Form the "Weakness" Ratio. For each pair of occupations, compute the "Weakness" Ratio defined as follows:

$$^fW_a^t = \sum_{i=1...n}^{G_i^a>0} G_i^a \Big/ \sum_{i=1}^{i=n} TT_i^a$$

9. Coefficient of "Strength:" This is the Descriptor "Strength" of occupation "f" to transition to occupation "t" and computed as follows:

$$^fS_a^t = 1 - ^fW_a^t$$

10. Compute the Correlation Coefficient, also known as the "Pearson product-moment correlation coefficient" and is defined as the covariance of the two variables divided by the product of their standard deviations, as follows:

$$^fCC_a^t = \text{CORREL}(\text{Vector}TT^a : \text{Vector}FT^a)$$

11. Finally, calculate the Descriptor TORQ for occupation f to occupation t as"

$$\text{TORQ}_{f\,tot}^a = [(x_a *^f CC_a^t) + (y_a *^f S_a^t)]/((x_a + y_a))$$

Where $x_a$ and $y_a$ are both $\geq 0$ and $\leq 1$ but $(x_a + y_a) = 1$.

11. The choice of $x_a$ and $y_a$ obviously are the weights assigned to the Correlation Coefficient and the Strength Coefficient respectively.

12. The mini TORQs for Abilities, Skills and Knowledge are computed analogously to that explained here for "Descriptor."

13. The three mini-TORQ scores are averaged to form the "Grand TORQ" score for every one of the $(m^2-m)$ "From-To" pairs of "m" occupations included in the current set of O*NET occupations. That average may be "weighted" by multiplying "weights" to each of the mini-TORQ scores and then summing the products thereby derived. The "weights" may or may not be equal to one another but each of them must be positive, less than or equal to 1, and their sum must equal one (1).

Rapid Job Profiling Tool (RJPT)

This section describes the Rapid Job Profiling Tool ("RJPT).

Background:

A variety of purposes, including the web-based TORQ™ applications, require a comprehensive description of the attributes needed by a worker to fulfill the requirements of an occupation or job (the "Target Job). Such a description is termed a "Profile." A profile consist of a set of "Descriptors." Such a Descriptor could, for example, include the Knowledge, Skills and Abilities (the "KSAs") or other competencies or capabilities required of a worker who is qualified to fulfill a particular job or an occupation.

Definitions:

Job: A specific group of homogeneous tasks related by similarity of functions. Typically a job describes a set of tasks or work required by a specific employer at a given time and place. Example of a Job: A Maintenance Technician employed by Target who performs preventative maintenance and necessary repairs to maintain operation of conveyors and sorter equipment and "Red Tag" down equipment as necessary involving 3-phase 480 volt and industrial electrical systems, motor controls and related electronic equipment. Also organizes a neat maintenance shop and may perform carpentry work as required. Source: Job posting by Target Careers on Mar. 5, 2013 for work in Midlothian, Tex.

Occupation: A generic category of relatively similar jobs. An occupation may subsume many specific jobs. Example of an Occupation: Maintenance Workers, Machinery (O*NET-SOC Code 49-9043.00).

Descriptor: A broad category of attributes required in some degree by a job or an occupation. Examples of Descriptors: Knowledge, Skills, Abilities (commonly denoted as KSAs). In specific circumstances or taxonomies and for specific jobs or occupations, there may be many other descriptors.

Element: One of possibly several specific attributes comprising a descriptor. Example of an Element: The ability to listen to and understand information and ideas presented through spoken words and sentences. (Within the O*NET lexicon, that Ability element is termed "Oral Comprehension" and bears the O*Net Element ID of 1.A.1.a.1.

Level: A numeric score denoting the degree of proficiency or capability in a specific descriptor that a worker needs to have in order to perform a job or occupation. The Level score often but not necessarily lies in the interval 0 to 100 where a lower score denotes a lower degree of proficiency/capability and a higher score indicates a greater degree.

Importance: A numeric score denoting the degree of importance of a specific descriptor that a worker needs to have in order to perform a job or occupation. The Importance score often but not necessarily lies in the interval 0 to 100 where a lower score denotes a lower coefficient of importance and a higher score indicates a higher coefficient of importance.

Job Profile: An assembly of: (i) A general description of a job or occupation including the responsibilities and requirements thereof. (ii) A specification of the appropriate Descriptors and their Elements appropriate of the job or occupation together with the Level and Importance scores of those Elements.

Target Job: A job or occupation for which a job profile is to be developed.

Job Profiler: ("Profiler"): A person who undertakes the senior responsibility for developing and coordinating the development of a Job Profile for a given Target Job.

Job Profiling Exercise: The set of activities to be carried out in the process of developing a Job Profile for a Target Job. The RJPT described in this document is a unique and proprietary methodology for conducting a Job Profiling Exercise.

Reference Occupation: A job or occupation that is similar in some important respects to the Target Job.

RJPT Database: A set of data, normally but not necessarily residing in and retrievable from a computer or other electronic memory device and used by the RJPT in the type of Job Profiling Exercise described herein. Such a database includes, among other items of data, the previously prepared Job Profiles of a set of Jobs which may be quite large in number. Example of a RJPT Database: Any of the databases, including the most recent version, that form part of the O*NET-SOC Taxonomy. For details on that Taxonomy as it exists at the time of this writing, please see "The O*NET-SOC Taxonomy." Other examples or illustrations of an RJPT Database would be any extension or modification of that included in the O*NET-SOC Taxonomy, or the ACT® Job-Pro® Database, or any other set of Job Profiles developed as part of an employer's or other profiling efforts. The distinguishing characteristic of an RJPT Database is that it should contain Job Profiles of all the Jobs contained therein.

Subject Matter Expert ("SME"): A person with a deep understanding of the tasks, responsibilities, and other requirements of a Target Job that is to be profiled using the RJPT.

SME Focus Group: One or more SMEs that have been chosen and recruited, typically by the Job Profiler, for the purpose of participating in a Job Profiling Exercise. Such a SME Focus Group may accomplish its work by meeting together with the Job Profiler in close physical proximity or via electronic connection. The Group may work with the Job Profiler collectively, or individually ad seriatim, or in any other combination depending of their own locations and the work plan of the Job Profiler.

Task: A detailed description of the physical and/or mental work or efforts specific to the Target Job or any other Job.

Task List: A complication of all the Tasks involved in performing a specific Target Job or any other Job.

Creating a Job Profile with the RJPT:

This section describes and illustrates the procedure to be followed in performing a Job Profiling Exercise for a specific Target Job while using the RJPT. The distinguishing characteristic of the RJPT is that it proceeds expeditiously and without the necessity of detailed specification of either Tasks or a Task List or the performance of any Task Analysis whatsoever. Conventional methods of job profiling (e.g., that method specified by ACT WorkKeys® job analysis system) include a comprehensive procedure of Task Analysis. Performing such a Task Analysis or otherwise preparing a Task List typically is very labor intensive, time consuming and expensive. The value and unique contribution of the RJPT is that it obviates the necessity of performing such intermediate steps as preparing a Task List and/or a Task Analysis. Meanwhile, using the RJPT results rapidly in a high-quality Job Profile.

The RJPT Procedure:

The RJPT Procedure is illustrated graphically by FIG. 1, TORQ's Rapid Job Profiling Tool that appears on the next page. The following paragraphs provide explanations of each of the steps that are denoted by numbered boxes in FIG. 1.

0. Start: The Job Profiler begins the Job Profiling Exercise.
1. Select the Target Job: The Job Profiler, in consultation with employer representatives or other colleagues, identifies a specific job or occupation to be profiled.
2. Recruit SMEs: The Job Profiler, in consultation with those familiar with the Target Job and the circumstances surrounding the Job Profiling Exercise, identifies Subject Matter Experts (SMEs) and recruits them as participants in a SME Focus Group for the purpose of participating in the Job Profiling Exercise.
3. Convene SME Focus Group: The Job Profiler convenes the SME Focus Group. This may take place as one or more meetings of the SMEs together or individually ad seriatim or by means of electronic communication or by any combination of these methods.
4. Identify the Reference Occupations: The SMEs, working with the Job Profiler, consider and chose as many jobs that have been already profiled in the RJPT Database as they consider appropriate for the purpose of profiling this particular Target Job. Although none of the Reference Occupations must be identical to the Target Job in terms of the Descriptors that characterize it, each one that is chosen should have some characteristics in common with the Target Job.
5. Choose Appropriate Descriptors: The Job Profiler, working with the SMEs, chooses specific Descriptors (e.g., Knowledge, Skills, Abilities or "KSAs") and Elements comprising them to be profiled for the Target Job. Very likely, the Job Profiler and SMEs will consider some subset of the Descriptors to be relevant to the Target Job. The Job Profiling Exercise will concentrate on that subset. At the beginning of the Job Profiling Exercise, the Job Profiler will select the first Descriptor on the list thereof. Until the Exercise has been completed for all remaining Descriptors, the following steps from step 6 through step 11 will be repeated.
6. Begin the cycle of determining Value and Importance scores for the selected Descriptor Element: The Job Profiler selects for SME consideration the first or next sequential Element for the chosen Descriptor.
7. Display the Level and Importance Scores of this Element: For the consideration of the SMEs, the Job Profiler displays the Level and/or Importance scores of all the Reference Occupations. Such a display occurs on a computer screen or other display device that best suits the location and situation of all concerned.
8. Facilitated by the Job Profiler, the SMEs determine appropriate values for this Element Score for the Target Job: With the Level and/or Importance Scores of this Element for the Reference Occupations displayed before them, the SMEs discuss and debate what should be the corresponding Score for the Element under consideration for the Target Occupation. From this discussion arises a consensus or majority vote that determines that Score for the purpose of this Job Profiling Exercise.

9. Record the determined value of this Element Score for the Target Job: The Job Profiler records on a computer-based file or other document the Element Score that the SMEs have determined to be appropriate for the Target Job.
10. Decide if more Elements remain to be determined for this Descriptor: If the Job Profiler decides that there are no more Elements to be determined for this Descriptor, then the procedure passes to step 11. However, if the Job Profiler decides that there do exist more Elements remaining to be determined, then the sequence of steps beginning at step 6 is repeated.
11. Decide if more Descriptors remain for this Target Job: If the Job Profiler decides that there are no more Descriptors with Elements still to be determined for this Target Job, then the procedure passes to step 12. However, if the Job Profiler decides that there do exist more Descriptors with Elements remaining to be determined, then the sequence of steps beginning at step 5 is repeated.
12. End the Job Profiling Exercise for this Target Job: Arrival this step completes the Job Profiling Exercise for this Target Job. The scores that have been determined for all the selected Elements of the selected Descriptors are entered for this Target into the RJPT Database whence they can be made ready for input into the TORQ™ on-line computer application.

An Example of the RJPT in Action

Background: Many veterans and military service personnel need assistance in finding appropriate civilian employment once their military service has ended. The on-line computerized TORQ applications are widely used to provide such assistance. The versions of TORQ applications that exist as of the time of this writing employ the most recent O*NET database at the core of the applications.

Regrettably, such assistance cannot be provided to many veterans or service personnel whose military experience has been in the most numerous and basic military occupations. The reason for that is as follows: While the O*NET database includes codes and names for the military "Combat Occupations" (See Table 1), that database unfortunately contains no scores for the Descriptor (i.e., KSA) Elements for any of those Combat Occupations. That obviously greatly reduces the help that the TORQ applications can provide to this important class of veterans and about-to-be discharged soldiers.

TABLE 1

| O*NET Code | Combat Occupation Name per O*NET |
|---|---|
| 55-1011.00 | Air Crew Officers |
| 55-1012.00 | Aircraft Launch and Recovery Officers |
| 55-1013.00 | Armored Assault Vehicle Officers |
| 55-1014.00 | Artillery and Missile Officers |
| 55-1015.00 | Command and Control Center Officers |
| 55-1016.00 | Infantry Officers |
| 55-1017.00 | Special Forces Officers |
| 55-1019.00 | Military Officer Special and Tactical Operations Leaders, All Other |
| 55-2011.00 | First-Line Supervisors of Air Crew Members |
| 55-2012.00 | First-Line Supervisors of Weapons Specialists/Crew Members |
| 55-2013.00 | First-Line Supervisors of All Other Tactical Operations Specialists |
| 55-3011.00 | Air Crew Members |
| 55-3012.00 | Aircraft Launch and Recovery Specialists |
| 55-3013.00 | Armored Assault Vehicle Crew Members |
| 55-3014.00 | Artillery and Missile Crew Members |
| 55-3015.00 | Command and Control Center Specialists |
| 55-3016.00 | Infantry |
| 55-3017.00 | Radar and Sonar Technicians |
| 55-3018.00 | Special Forces |

TABLE 1-continued

| O*NET Code | Combat Occupation Name per O*NET |
|---|---|
| 55-3019.00 | Military Enlisted Tactical Operations and Air/Weapons Specialists and Crew Members, All Other |

To remedy the unfortunate circumstance just described, Workforce Associates, Inc., in collaboration with a group of recently retired senior non-commissioned officers, has undertaken a program to determine appropriate scores for all relevant Elements of the O*NET Descriptors (i.e., the KSAs) so that the TORQ applications can be used to assist soldiers and veterans whose military experience has been in the Combat Occupations. The example adduced here is a description of how the RJPT has been and is being used to profile those Combat Operations.

Elements of the Example:

Dates of this (the first) Job Profiling Exercise: Mar. 23, 2012 and Apr. 4, 2012.

Occupation: O*NET Code: 55-3016.00, Infantry.

Target Job: Army Infantryman, MOS 11B.

Job Profiler: Two senior staff members of Workforce Associates, Inc.

Descriptor: Abilities

Element: The Level score of O*NET Code: 1.A.2.b.2, denoting "Multilimb Coordination" defined as the ability to coordinate two or more limbs (for example, two arms, two legs, or one leg and one arm) while sitting, standing, or lying down. It does not involve performing the activities while the whole body is in motion. This Level score and all others chosen for the Elements of this Target Job were scored on a scale from zero (no competence required) to 100 (highest possible level of competence required).

Subject Matter Experts: Recently discharged Army non-commissioned officers.

SME Focus Group: Four recently discharged Army Master Sergeants residing in Massachusetts and Pennsylvania.

Job Profiling Exercise: To create a Job Profile of Army Infantryman, MOS 11B. This Exercise was conducted with members of the SME Focus Group and the Job Profiler sharing a conference call telephone connection and via a web-hosted service that enabled the Job Profiler to share his computer screen and to "meet" remotely with the members of the SME Focus Group.

Reference Occupations: The Job Profiler and members of the SME Focus Group determined that these civilian occupations were similar to the Target Job, "Army Infantryman 11B" in some, but not all, important respects. The selected Reference Occupations and their Level scores for Multlimb Coordination (code 1.A.2.b.2) are shown in Table 2. In this Job Profiling Exercise as it was actually conducted, the members of the SME Focus Group were also shown, for their consideration and comparative purposes, a complete list of Level scores for Multilimb Coordination for more than 850 occupations. Because of limitation of space, that complete list is not shown here in this Example.

TABLE 2

Selected Reference Occupations, their O*NET Codes and Their Level Scores for Multilimb Coordination

| Element Code | Element Name | Level Score for Multilimb Coordination |
|---|---|---|
| 33-2011.02 | Forest Firefighters | 57 |
| 33-3051.01 | Police Patrol Officers | 46 |
| 45-3021.00 | Hunters and Trappers | 45 |
| 47-2061.00 | Construction Laborers | 48 |

TABLE 2-continued

Selected Reference Occupations, their O*NET
Codes and Their Level Scores for Multilimb Coordination

| Element Code | Element Name | Level Score for Multilimb Coordination |
|---|---|---|
| 47-5012.00 | Rotary Drill Operators, Oil and Gas | 50 |
| 51-3023.00 | Slaughterers and Meat Packers | 38 |
| 53-7062.00 | Laborers and Freight, Stock, and Material Movers, Hand | 50 |
| 27-2021.00 | Athletes and Sports Competitors | 46 |
| 29-2041.00 | Emergency Medical Technicians and Paramedics | 50 |

Consensus of the SME Focus Group: After brisk discussion, the SME Focus Group arrived at a consensus of what should be the Level score for Multilimb Coordination for the Target Job. That score was set at the value of 54 which was above the Levels of all the Reference Occupations except for Forest Firefighters.

Completion of the Job Profiling Exercise: The process just described (and illustrated in FIG. 1) was conducted for 120 chosen Elements of all of the three chosen Descriptors (i.e., Knowledge, Skills and Abilities) for the Target Job, "Army Infantryman 11B." Table 3, below, displays a few of the scores for Abilities Elements.

TABLE 3

A Small Portion of the Job Profile for MOS 11B, Army Infantryman as Developed Using the Rapid Job
Profiling Tool in the Example Adduced Here. There are 120 Elements in this Profile

| | Element Code | | 1.A.2.c.1 | 1.A.2.c.2 | 1.A.2.c.3 | 1.A.3.a.1 | 1.A.3.a.2 | 1.A.3.a.3 | 1.A.3.a.4 | 1.A.3.b.1 |
|---|---|---|---|---|---|---|---|---|---|---|
| 55-3016.01 | Occupation: Army Infantry | | Reaction Time | Wrist-Finger Speed | Speed of Limb Movement | Static Strength | Explosive Strength | Dynamic Strength | Trunk Strength | Stamina |
| Army MOS | Target Job: 11B Infantryman | Level Importance | 70 75 | 35 41 | 47 54 | 58 65 | 50 53 | 61 65 | 58 69 | 56 69 |

CONCLUSION

The RJPT described herein is a very flexible and powerful tool that may be used to develop Job Profiles for any number and types of jobs extending from broad occupational categories to jobs that are very specific to individual employers at specific places and times.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification.

The invention claimed is:

1. A computer-implemented method for measuring the transferability of workers between occupations comprising: using a computer to perform computations; performing mathematical computations on a set of numerical values, which indicate worker attributes required of individual workers who perform those occupations, to produce resulting values; and aggregating the resulting values into a single numeric value defining a feasibility of transferring workers from one occupation to another.

2. The method of claim 1, wherein the step of aggregating the resulting values further comprises performing basic statistical correlation between two sets of numerical values, which indicate required worker attributes, to produce a correlation coefficient for a pair of occupations, and further adjusting the correlation coefficient to account for an asymmetry of the feasibility of potential bilateral transfer of workers between the pair of occupations.

3. The method of claim 1, further comprising: retrieving from a database the sets of numerical values which indicate required worker attributes, and labor market data, the database being selected from the group consisting of the U.S. Department of Labor's Occupational Information Network (O*NET) database and a custom database which contains a range of required attributes for a range of occupations.

4. The method of claim 1, wherein the required worker attributes are selected from the group consisting of: abilities, skills, knowledge, interests, education and experience.

5. The method of claim 3, wherein each required attribute has a set of assigned scores included in the database which further define each attribute.

6. A computer-implemented method for measuring the transferability of workers between occupations comprising:
   using a computer to perform computations;
   entering into a matrix sets of scores for a selected worker attribute that are required for an occupation, the sets of scores for each attribute being one or more sets $S^k$ consisting of $N^k$ scores, where $S^k \ni x_j$ ($j=1, 2, \ldots N^k$);
   in cases where there exist two or more equally-dimensioned sets of scores for a single worker attribute, then computing a product of selected scores, where the corresponding elements of the sets may be weighted unequally, for the attribute to produce a composite attribute value;
   entering the composite attribute value into a matrix;
   repeating the previous steps for each occupation in a set of occupations; and
   computing a correlation coefficient for a pair of occupations by correlating the composite attribute values for a pair of occupations.

7. The method of claim 6, wherein the selected sets of scores for each composite attribute are the Level and Importance scores.

8. The method of claim 7, wherein computing the correlation coefficient of two data sets from two occupations is done by the following formula:

$$Correl(X, Y) = \frac{\sum_{i}^{N^k} \{(x_i - \mu_x)(y_i - \mu_y)\}}{\left[\sqrt{\sum_{i}^{N^k} (x_i - \mu_x)^2 \sum_{i}^{N^k} (y_i - \mu_y)^2}\right]}$$

wherein: X and Y represent two vectors in a set, $S^k$, of scores for the $x^{th}$ and $y^{th}$ occupations in a set of occupations; where both x and y run from 1 to N, where N is the number of occupations in the set of occupations and x and y are values assigned to each occupation; k is a value indicating a Level assigned to an individual worker attribute; $x_i{}^a X$; $y_i{}^a Y$; i=1, 2, ... $N^k$;

$$\mu_x = \frac{\sum_{i}^{N^k} \{x_i\}}{N^k}$$

is the mean value of the X vector and $$\mu_{xy} = \frac{\sum_{i}^{N^k} \{y_i\}}{N^k}$$

is the mean value of the Y vector.

9. The method of claim 8, wherein the correlation coefficients are normalized on a 1 to 100 scale.

10. The method of claim 8, wherein the correlation coefficient is adjusted by:
producing a ratio whereof the numerator is calculated as the sum of the differences between the members of each pair of the composite Level-Importance scores for two selected occupations, the two selected occupations being a source occupation and a destination occupation, for which the composite Level-Importance scores for the destination occupation exceed the composite Level-Importance scores for the source occupation, and the denominator is calculated as the raw sum of the composite Level-Importance scores of the destination occupation; and
adjusting the correlation coefficients for each composite attribute by averaging it with the produced ratios.

11. The method of claim 10, further comprising displaying the adjusted correlation coefficients in a graphical user interface on a computer.

12. The method of claim 11, further comprising downloading labor market information relevant to each selected occupation from a database and displaying the labor market information with the adjusted correlation coefficients with display options corresponding to specifications of an end user for statistical and analytical reporting on each occupation and occupation transfer selected for analysis.

13. A computer-implemented method for computing a correlation coefficient for a pair of occupations as an indication of transferability of workers between the occupations comprising:
identifying a specific target occupation to be profiled;
identifying Subject Matter Experts (SMEs) for the specific target occupation to be profiled;
recruiting SME's as participants in a SME Focus Group;
identifying reference occupations having some characteristics in common with the target occupation;
choosing appropriate descriptors and elements comprising the descriptors and values of the elements to be profiled for the target job by the following steps with the input of the SME Focus Group:
a) selecting a first descriptor;
b) determining each element for the first descriptor;
c) determining a numerical element score for each element for the first descriptor based on corresponding level and importance scores for that element of reference occupations;
d) recording the element score for each element for the first descriptor; and
e) repeating steps a)-d) for each descriptor to be profiled for the target job;
entering the scores for each element of each descriptor for the target job into a database;
using a computer to perform computations;
selecting the pair of occupations;
for each occupation in a set of occupations:
entering into a matrix or database a set of scores for a selected individual worker attribute for an occupation, the set of scores for each attribute being one or more sets $S^k$ consisting of $N^k$ scores, where $S^k \ni x_j$ (j=1, 2, ... $N^k$);
computing, with the computer, a product of an Importance score and a Level score for the attribute to produce a composite attribute value;
entering the composite attribute value into the matrix;
computing the difference between the computed product for each attribute between any pair of occupations;
computing the sums of all differences between the computed product for each attribute between any pair of occupations to equal the total difference;
entering the total difference value into the matrix;
accessing, with the computer, data in the matrix;
computing, with the computer, a correlation coefficient for the pair of occupations by correlating the composite attribute value for the pair of occupations by the following formula:

$$Correl(X, Y) = \frac{\sum_{i}^{N^k} \{(x_i - \mu_x)(y_i - \mu_y)\}}{\left[\sqrt{\sum_{i}^{N^k} (x_i - \mu_x)^2 \sum_{i}^{N^k} (y_i - \mu_y)^2}\right]}$$

wherein: X and Y represent two vectors in a set, $S^k$, of scores for the $x^{th}$ and $y^{th}$ occupations in a set of occupations; where both x and y run from 1 to N, where N is the number of occupations in the set of occupations and x and y are composite attribute values assigned to each occupation; k is a value indicating a Level assigned to an individual worker attribute; $x_i{}^a X$; $y_i{}^a Y$; i=1, 2, ... $N^k$;

$$\mu_x = \frac{\sum_{i}^{N^k} \{x_i\}}{N^k}$$

is the mean value of the X vector and $$\mu_{xy} = \frac{\sum_{i}^{N^k} \{y_i\}}{N^k}$$

is the mean value of the Y vector normalizing the correlation coefficients on a scale of 1 to 100;

adjusting the normalized correlation coefficients by producing a ratio whereof the numerator is calculated as the sum of the differences between the members of each pair of the composite Level-Importance scores for two selected occupations, the two selected occupations being a source occupation and a destination occupation, for which the composite Level-Importance scores for the destination occupation exceed the composite Level-Importance scores for the source occupation, and the denominator is calculated as the raw sum of the composite Level-Importance scores of the destination occupation; and adjusting the correlation coefficients, with the computer, for each composite attribute by averaging it with the produced ratios; and producing a report of the correlation coefficients for all pairs of occupations in the set to indicate transferability of workers, indicated by a value of the correlation coefficients, between the occupations.

14. The method of claim 13, wherein adjusting the normalized correlation coefficient by the formula $(w^1 * NORMCORREL^d + w^2 * {}^A P^C)/(w^1 + w^2)$ wherein:

i. the source occupation is that from which it is proposed that one or more workers should be transferred;

ii. the destination occupation is that to which said workers are to be transferred;

iii. A equals a total number of attributes for a descriptor "d";

iv. N equals a number of positive differences, the number of attributes of the given descriptor "d" for which a standardized database score of the destination occupation exceeds a value of the same attribute for the source occupation;

v. $P^+$ is a percent of differences that are positive, N/A expressed as a percent;

vi. $NORMCORREL^d$ equals a normalized simple correlation coefficient between the scores of the attributes in the source and destination occupations, computed for the descriptor;

vii. $P^C$ equals the "Proximity Coefficient" which is a ratio of a sum of the scores of the source occupation to a sum of the scores of the destination occupation, but only for those attributes for which the score of the destination occupation exceeds that of the source occupation;

viii. $\Delta$ equals $1-P^C$, 1 minus the Proximity Coefficient;

ix. $\Omega$ equals $1-P^+$, 1 minus the percent of differences that are positive;

x. $\Gamma$ equals $\Delta * \Omega$ which is an addition to be made to $P^C$;

xi. ${}^A P^C$ equals $P^C + \Gamma$ which is a Adjusted Proximity Coefficient;

xii. $w^1$ equals a positive numerical weight assigned by a using analyst to $NORMCORREL^d$;

xiii. $w^2$ equals a positive numerical weight assigned by the using analyst to ${}^A P^C$; and xiv. $w^1$ may but need not necessarily equal $w^2$.

* * * * *